United States Patent
Sakai et al.

(10) Patent No.: US 10,520,320 B2
(45) Date of Patent: Dec. 31, 2019

(54) MANAGEMENT SYSTEM FOR WORK MACHINE, WORK MACHINE, AND MANAGEMENT DEVICE FOR WORK MACHINE

(71) Applicant: Komatsu Ltd., Tokyo (JP)

(72) Inventors: Atsushi Sakai, Chigasaki (JP); Masanori Tojima, Fujisawa (JP); Tomonori Ozaki, Naka-gun (JP)

(73) Assignee: KOMATSU LTD., Tokyo (JP)

( * ) Notice: Subject to any disclaimer, the term of this patent is extended or adjusted under 35 U.S.C. 154(b) by 62 days.

(21) Appl. No.: 15/767,473

(22) PCT Filed: Dec. 25, 2015

(86) PCT No.: PCT/JP2015/086429
§ 371 (c)(1),
(2) Date: Apr. 11, 2018

(87) PCT Pub. No.: WO2017/109999
PCT Pub. Date: Jun. 29, 2017

(65) Prior Publication Data
US 2018/0313653 A1 Nov. 1, 2018

(51) Int. Cl.
*G07C 5/08* (2006.01)
*G01C 21/32* (2006.01)
(Continued)

(52) U.S. Cl.
CPC ............. *G01C 21/32* (2013.01); *G01C 21/16* (2013.01); *G01C 21/20* (2013.01); *G05D 1/0088* (2013.01);
(Continued)

(58) Field of Classification Search
CPC ........ G01C 21/32; G01C 21/16; G01C 21/20; G06F 16/29; G05D 1/0088; G05D 1/0274;
(Continued)

(56) References Cited

U.S. PATENT DOCUMENTS 6,064,926 A  5/2000 Sarangapani et al.
6,880,643 B1* 4/2005 Zimmerman ............ E02F 3/84
                                                  172/4.5

(Continued)

FOREIGN PATENT DOCUMENTS

JP  11-242520 A   9/1999
JP  2002-215236 A 7/2002
(Continued)

OTHER PUBLICATIONS

International Search Report dated Mar. 22, 2016, issued for PCT/JP2015/086429.

*Primary Examiner* — Gertrude Arthur Jeanglaude
(74) *Attorney, Agent, or Firm* — Locke Lord LLP

(57) ABSTRACT

A management system 1 for a work machine includes: a plurality of dump trucks 2 each creating a map information piece DTI of a sectioned region DT around the own vehicle; and a management device 10 that manages map information pieces DTI of a plurality of sectioned regions DT created by the plurality of dump trucks 2 and transmits, to each of the dump trucks 2, a map information piece DTI of a sectioned region DT where each of the dump trucks 2 exists and a map information piece DTI of a sectioned region DT adjacent to the sectioned region DT where each of the dump trucks 2 exists on the basis of information related to a position of each of the dump trucks 2.

10 Claims, 12 Drawing Sheets

(51) Int. Cl.
*G06F 16/29* (2019.01)
*G09B 29/00* (2006.01)
*G05D 1/02* (2006.01)
*G06Q 10/10* (2012.01)
*G07C 3/08* (2006.01)
*G01C 21/16* (2006.01)
*G01C 21/20* (2006.01)
*G05D 1/00* (2006.01)
*G07C 5/00* (2006.01)

(52) U.S. Cl.
CPC ......... *G05D 1/0274* (2013.01); *G05D 1/0278* (2013.01); *G06F 16/29* (2019.01); *G06Q 10/101* (2013.01); *G07C 3/08* (2013.01); *G07C 5/008* (2013.01); *G07C 5/0808* (2013.01); *G09B 29/004* (2013.01); *G09B 29/007* (2013.01); *G05D 2201/021* (2013.01); *G05D 2201/0202* (2013.01)

(58) Field of Classification Search
CPC ......... G05D 1/0278; G05D 2201/0202; G05D 2201/021; G06Q 10/101; G07C 5/008; G07C 5/0808; G09B 29/004; G09B 29/007

USPC ....................................................... 701/446
See application file for complete search history.

(56) References Cited

U.S. PATENT DOCUMENTS

| | | | |
|---|---|---|---|
| 6,937,959 B2 * | 8/2005 | Keyl | G03F 1/78 382/148 |
| 2002/0099481 A1 | 7/2002 | Mori | |
| 2003/0069668 A1 * | 4/2003 | Zurn | E01C 19/006 700/245 |
| 2013/0238182 A1 | 9/2013 | Osagawa et al. | |
| 2015/0112537 A1 | 4/2015 | Kawamata et al. | |

FOREIGN PATENT DOCUMENTS

| | | |
|---|---|---|
| JP | 2003-114613 A | 4/2003 |
| JP | 2008-021023 A | 1/2008 |
| JP | 2012-118694 A | 6/2012 |
| JP | 2015-082193 A | 4/2015 |
| JP | 2015-194924 A | 11/2015 |

* cited by examiner

MANAGEMENT SYSTEM FOR WORK MACHINE, WORK MACHINE, AND MANAGEMENT DEVICE FOR WORK MACHINE

FIELD

The present invention relates to a management system for a work machine, a work machine, and a management device for a work machine.

BACKGROUND

A mining machine provided as a work machine such as a dump truck operates in a mining site of a mine as disclosed in Patent Literature 1, for example.

CITATION LIST

Patent Literature

Patent Literature 1: Japanese Laid-open Patent Publication No. 11-242520 A

SUMMARY

Technical Problem

In a work machine that autonomously travels on a travel route in a mine, in a case where abnormality occurs in an ionosphere, accuracy of a position detected by using a global navigation satellite system may be deteriorated and operation may be stopped. As a result, there is a possibility that productivity in the mine may be deteriorated.

The present invention is directed to providing a management system for a work machine, a work machine, and a management device for a work machine capable of suppressing deterioration of productivity in a mine.

Solution to Problem

According to an aspect of the present invention, a management system for a work machine, comprises: a plurality of work machines each configured to create a map information piece of a region around an own vehicle; and a management device configured to manage map information pieces of a plurality of the regions created by the plurality of work machines respectively, and configured to transmit, to each of the work machines, a map information piece of a region where each of the work machines exists and a map information piece of a region adjacent to the region where each of the work machines exists on the basis of information related to a position of each of the work machines.

It is preferable that the management device preferentially transmits a map information piece of a region created by each of the work machines from among the map information pieces of the plurality of regions.

It is preferable that the management device preferentially transmits a map information piece of a region having a short elapsed time after being created from among the map information pieces of the plurality of regions.

It is preferable that the work machine includes: a map information storing unit configured to store a map information piece of the region received from the management device; a measurement output unit configured to detect a position by matching the map information piece of the region stored in the map information storing unit with a detection result obtained by a distance measuring sensor that detects a position of a surrounding object; and a determining unit configured to determine whether movement is made to an adjacent region, when the determining unit determines that the work machine is moved to the adjacent region, the measurement output unit transmits, to the management device, request information to request a map information piece of a different region adjacent to the adjacent region together with information related to a position of the work machine, and when the request information is received, the management device extracts the different region on the basis of the information related to the position of the work machine, and transmits a map information piece of the extracted different region to the work machine.

It is preferable that the different region for which the measurement output unit transmits the request information to the management device is a region having a map information piece not yet stored in the map information storing unit.

According to an aspect of the present invention, a work machine comprises: a map information storing unit configured to store a map information piece of a region where an own vehicle exists and a map information piece of a region adjacent to the region where the own vehicle exists from among map information pieces of a plurality of regions created by a plurality of work machines; a distance measuring sensor configured to detect a position of a surrounding object; a position detecting unit configured to detect a GPS position; a determining unit configured to determine whether movement is made to an adjacent region and also configured to determine whether an error of a GPS position detected by the position detecting unit is a predetermined error or less; and a measurement output unit configured to detect a position of an upward projecting object projecting upward from a surface of a travel route on the basis of a detection result obtained by the position detecting unit and a detection result obtained by the distance measuring sensor when the determining unit determines that an error of a GPS position detected by the position detecting unit is the predetermined error or less, the measurement output unit being configured to transmit, to a management device, a position of the detected upward projecting object, as the map information piece of the region, when the determining unit determines that movement is made to the adjacent region.

It is preferable that when the determining unit determines that an error of a GPS position detected by the position detecting unit exceeds the predetermined error, the measurement output unit detects a position of the work machine by matching a detection result obtained by the distance measuring sensor with a map information piece of a region stored in the map information storing unit, and when the determining unit determines that movement is made to the adjacent region, the measurement output unit transmits, to the management device, request information to request a map information piece of a different region adjacent to the adjacent region together with information related to a position.

It is preferable that the different region for which the measurement output unit transmits the request information to the management device is a region having a map information piece not yet stored in the map information storing unit.

According to an aspect of the present invention, a management device for a work machine configured to: manage map information pieces of a plurality of regions created by a plurality of work machines, and also transmit, to each of the work machines, a map information piece of a region where each of the plurality of work machines exists and a map information piece of a region adjacent to the region where each of the work machines exists from among the plurality of regions; and extract a different region on the basis of information related to a position of the work machine, and transmit a map information piece of the extracted different region to the work machine when the work machine is moved to an adjacent region and request information to request the map information piece of the different region adjacent to the adjacent region is received together with the information related to the position of the work machine.

It is preferable that the different region for which a map information piece is transmitted to the work machine is a region having a map information piece not yet stored in the work machine.

Advantageous Effects of Invention

According to the present invention, deterioration of productivity in a mine is suppressed.

DESCRIPTION OF EMBODIMENTS

In the following, an embodiment of the present invention will be described with reference to the drawings, but the present invention is not limited thereto.

Embodiment

Overview of Management System for Work Machine

Figure 1:
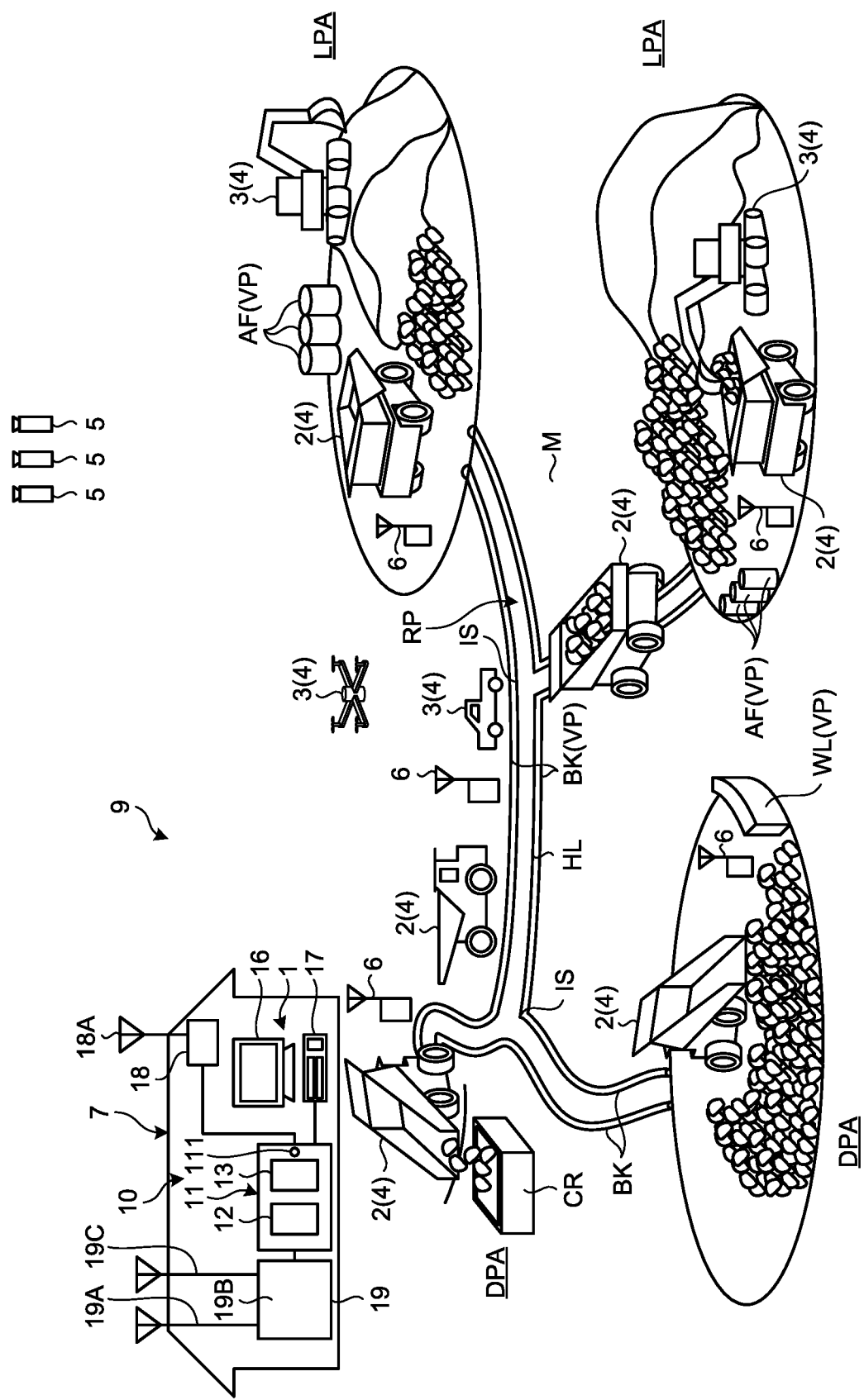
FIG. 1 is a view illustrating an exemplary management system for a work machine according to an embodiment.

FIG. 1 is a view illustrating an exemplary management system for a work machine according to an embodiment.

Figure 2:
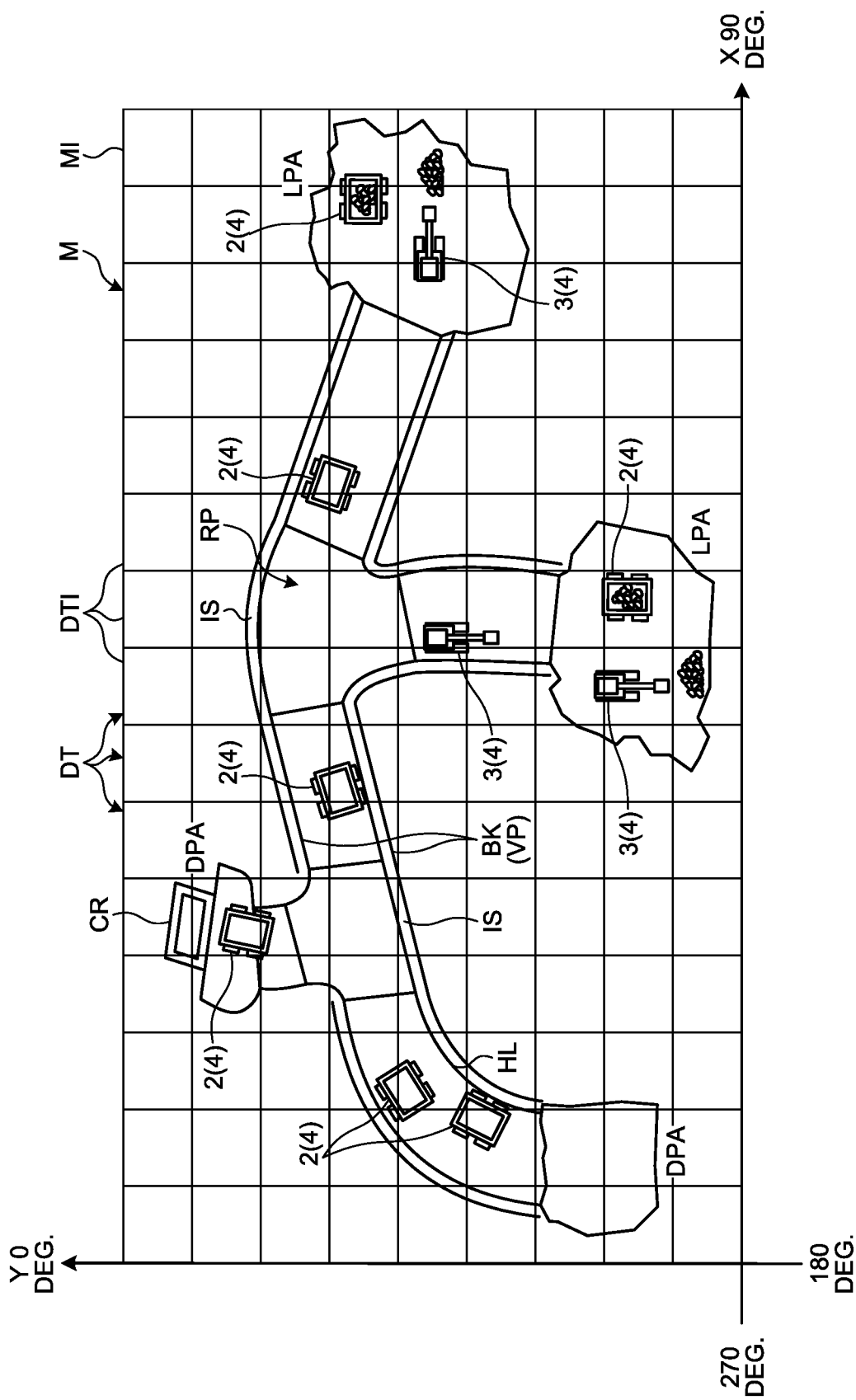
FIG. 2 is a plan view illustrating an exemplary mine in which the management system for a work machine according to the embodiment is applied.

FIG. 2 is a plan view illustrating an exemplary mine in which the management system for a work machine according to the embodiment is applied.

A management system 1 for a work machine (hereinafter referred to as a management system) manages a work machine. Management for a work machine includes at least one of operational management for a work machine, evaluation on productivity of a work machine, evaluation on operation technique of an operator of a work machine, maintenance for a work machine, and abnormality diagnosis for a work machine.

A work machine is a generic term for machinery used in various kinds of work in a mine M provided as an exemplary work site illustrated in FIGS. 1 and 2. The work machine includes at least one of a boring machine, an excavating machine, a loading machine, a hauling machine, a crusher, a drone flying above the mine M, a vehicle operated by a worker, and a service car operated by a service technician. The boring machine, excavating machine, loading machine, hauling machine, crusher, drone flying above the mine M, vehicle operated by a worker, and service car operated by a service technician are mining machines used in various kinds of work in the mine M. The excavating machine can excavate the mine M. The loading machine can load matters to be loaded on the hauling machine. The loading machine includes at least one of a hydraulic excavator, an electric excavator, and a wheel loader. The hauling machine includes a moving body movable in the mine M and is capable of hauling loaded matters. The hauling machine includes a dump truck. The loaded matters include at least one of earth, sand, and ore generated from mining work. The crusher crushes earth discharged from the hauling machine.

A description will be provided for an example in which the hauling machine provided as a work machine traveling in the mine M is managed by the management system 1, in this embodiment, an example in which a dump truck 2 provided as a work machine is managed. The dump truck 2 is also a mining machine used in the mine M, and as illustrated in FIGS. 1 and 2, the dump truck 2 operates at least the part of a loading place LPA, a discharging place DPA, a hauling path HL leading to at least one of the loading place LPA and the discharging place DPA, and an intersection IS at which hauling paths HL intersect each other in the mine M. A crusher CR to crush discharged earth may be disposed in at least one discharging place DPA. The mine M is provided with a bank BK formed by stacking earth in at least one or more of the outside of the loading place LPA, the outside of the discharging place DPA, and the outside of the hauling path HL.

The dump truck 2 is a moving body movable in the mine M. The dump truck 2 can travel at least in part of the loading place LPA, discharging place DPA, hauling path HL, and intersection IS. In other words, a travel route RP of a dump truck 2 provided in the mine M includes at least the part of the loading place LPA, discharging place DPA, hauling path HL, and intersection IS. In the mine M, an upward projecting object VP projecting upward from a surface of a travel route RP to a predetermined height or more is provided. In the embodiment, such an upward projecting object VP includes a bank BK provided outside the travel route RP, an artificial object AF constructed in at least one of the loading place LPA, discharging place DPA, and hauling path HL, and a wall WL constructed in at least one of the loading place LPA, discharging place DPA, and hauling path HL, but not limited thereto. The predetermined height is a height at which the dump truck 2 is not expected to climb over the upward projecting object VP at the time of performing autonomous travel.

The dump truck 2 is loaded with matters to be loaded in the loading place LPA. The dump truck 2 unloads (discharges) the loaded matters in the discharging place DPA. The dump truck 2 charges the discharged earth, namely, the loaded matters into the crusher CR in the discharging place DPA provided with the crusher CR. The dump truck 2 is a so-called unmanned dump truck that autonomously travels on the travel route RP in accordance with a command signal from a management device 10 normally functioning as a management device for a work machine during operation in the mine M. Autonomous travel performed by a dump truck 2 represents travel in accordance with a command signal from the management device 10 without depending on operation by a worker of the dump truck 2. Additionally, the dump truck 2 can also travel in accordance with operation by a worker (operator).

In FIG. 1, the management system 1 includes the management device 10 disposed in a control facility 7 constructed in the mine M, a communication system 9, a dump truck 2, different work machine 3. The management device 10 is installed in the control facility 7 of the mine M and is stationary. Additionally, the management device 10 may be also movable. In other words, the management device 10 is provided in the mine M. The communication system 9 transmits information by radio communication between the management device 10, the dump truck 2, and the different work machine 3. The communication system 9 enables bidirectional radio communication between the management device 10 and the dump truck 2, between the management device 10 and the different work machine 3, and between the dump truck 2 and the different work machine 3. In the embodiment, the communication system 9 has a plurality of repeaters 6 to relay data or a command signal (radio wave).

In the embodiment, a position of the dump truck 2 and a position of the different work machine 3 are detected by utilizing a real time kinematic-global navigation satellite system (RTK-GNSS, GNSS is a global navigation satellite system). As an example of the global navigation satellite system, a global positioning system (GPS) can be exemplified, but not limited thereto. The RTK-GNSS has a plurality of positioning satellites 5. The RTK-GNSS detects a position in a coordinate system (global coordinate system) that defines a latitude, a longitude, and an altitude. A position detected by the RTK-GNSS includes a latitude, a longitude, and an altitude. Using the RTK-GNSS, a position of a dump truck 2 in the mine M and a position of a different work machine 3 are detected. A position detected by the RTK-GNSS is an absolute position defined in the global coordinate system. In the following description, a position detected by the RTK-GNSS will be suitably referred to as a GPS position. A GPS position is an absolute position and is coordinate data (a coordinate value) including a latitude, a longitude, and an altitude. Additionally, in the RTK-GNSS, a positioning state is changed by influence of arrangement of the positioning satellites 5, an ionosphere, a troposphere, and a topography around an antenna that receives information from each of the positioning satellites 5. The positioning state includes, for example, a fix solution (accuracy from ±1 cm to 2 cm), a float solution (accuracy from ±10 cm to several m), a single solution (accuracy of about±several m), and a non-positioning state (impossible to perform positioning calculation).

Furthermore, the management system 1 manages positions of a dump truck 2 and a different work machine 3 in the mine M by using coordinates (hereinafter referred to as X-Y coordinates) defined by an X-axis direction and a Y-axis direction orthogonal to each other illustrated in FIG. 2. Additionally, the management system 1 manages an azimuth directions of the dump truck 2 and the different work machine 3 by setting the north at zero degrees, the east at 90 degrees, the south at 180 degrees, and the west at 270 degrees. The azimuth directions of the dump truck 2 and the different work machine 3 correspond to moving directions when the dump truck 2 and the different work machine 3 travel forward. Meanwhile, the Y-axis direction indicates the north in this embodiment, but not limited to thereto.

Management Device

Figure 3:
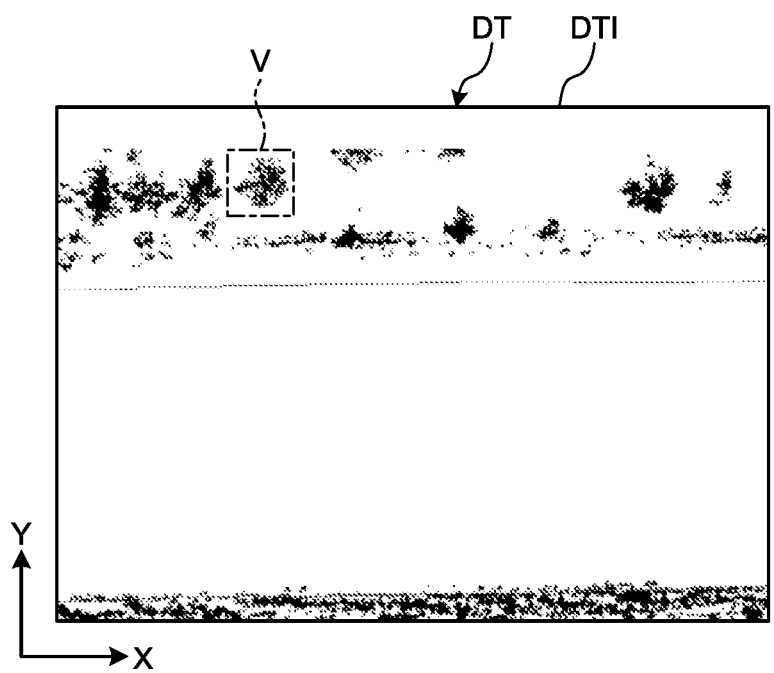
FIG. 3 is a diagram illustrating a map information piece of a sectioned region stored in a management device of the management system for a work machine according to the embodiment.
Figure 4:
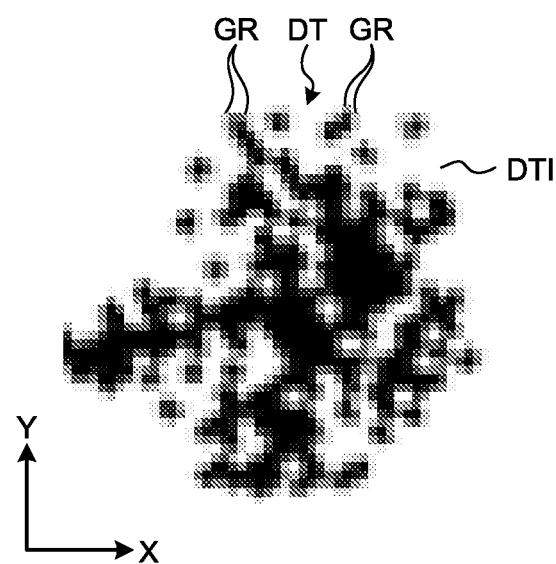
FIG. 4 is an enlarged view of a portion V in FIG. 3.
Figure 5:
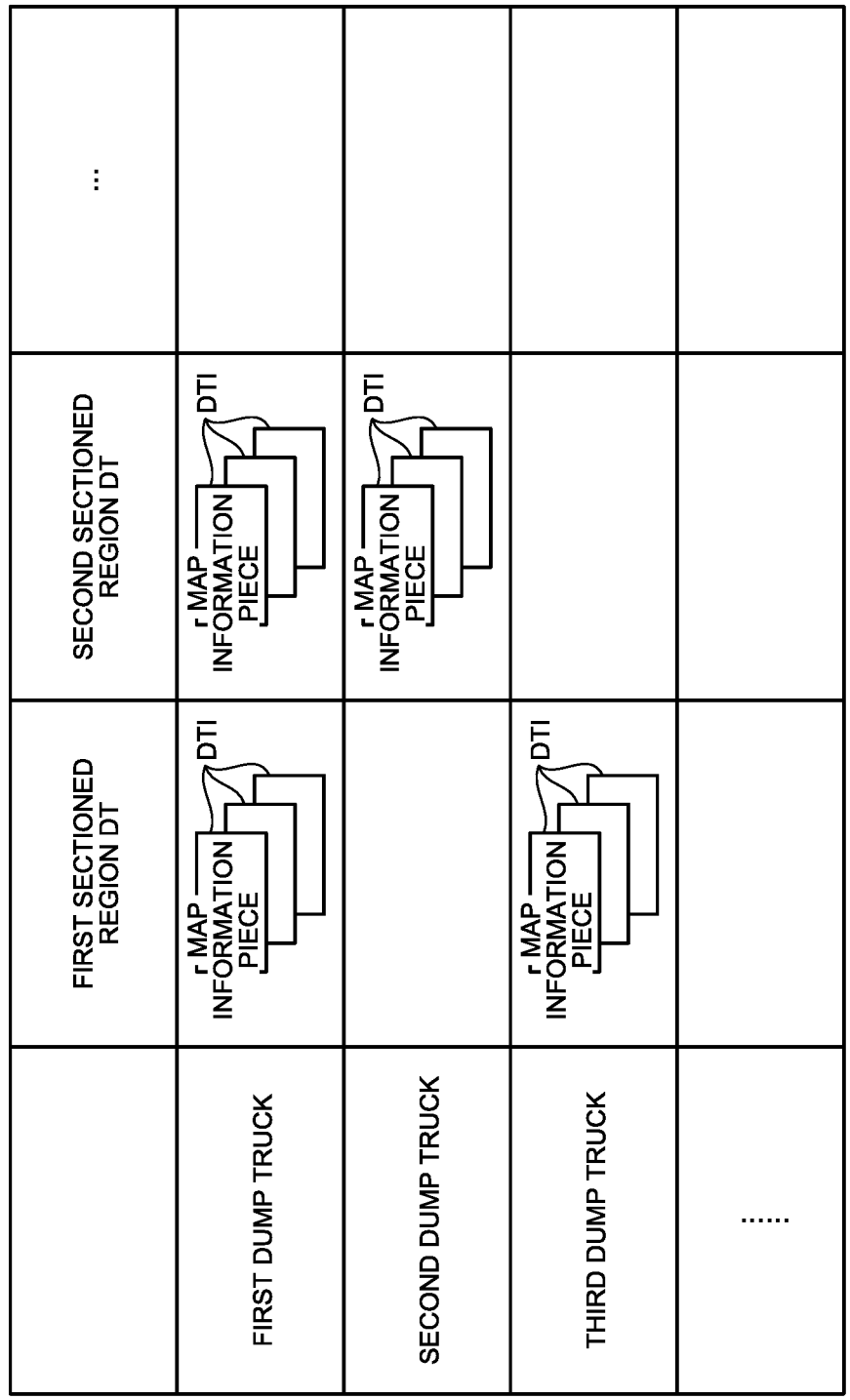
FIG. 5 is a diagram illustrating a correspondence relation between a map information piece of a sectioned region stored in the management device of the management system for a work machine and each work machine according to the embodiment.

Next, the management device 10 disposed in the control facility 7 will be described. FIG. 3 is a diagram illustrating a map information piece of a sectioned region stored in the management device of the management system for a work machine according to the embodiment. FIG. 4 is an enlarged view of a portion V in FIG. 3. FIG. 5 is a diagram illustrating a correspondence relation between a map information piece of a sectioned region stored in the management device of the management system for a work machine and each work machine according to the embodiment.

The management device 10 transmits, to a navigation system 30 (illustrated in FIG. 6) of a dump truck 2, travel route information that is information to designate a travel route RP provided in the mine M, and also manages map information MI of the entire mine M including information on the travel route RP illustrated in FIG. 2 (hereinafter simply referred to as the map information MI) by sectioning the map information MI into map information pieces DTI of sectioned regions DT corresponding to a plurality of regions. The management device 10 is a device to manage the map information pieces DTI of the plurality of sectioned regions DT, and includes a computer 11, a display device 16, an input device 17, a radio communication device 18, and a GPS base station 19 as illustrated in FIG. 1.

The computer 11 includes a processing device 12, a storage device 13, and an input/output unit 111. The display device 16, input device 17, radio communication device 18, and GPS base station 19 are connected to the computer 11 via the input/output unit 111. The input/output unit 111 is used (as an interface) to input/output information to/from at least one of the processing device 12, display device 16, input device 17, radio communication device 18, and GPS base station 19.

The processing device 12 executes various kinds of processing related to management for a dump truck 2 and various kinds of processing related to management for a different work machine 3. The processing device 12 processes information related to a position of a dump truck 2 and information related to a position of a different work machine 3 acquired via the communication system 9. The processing device 12 generates travel route information of a dump truck 2. The processing device 12 transmits the generated travel route information for a dump truck 2 to each dump truck 2 via the radio communication device 18. The storage device 13 is connected to the processing device 12. The storage device 13 stores various kinds of information related to management for a dump truck 2 and various kinds of information related to management for a different work machine 3. The storage device 13 stores a position of a dump truck 2 and a position of a different work machine 3. The storage device 13 stores a computer program to cause the processing device 12 to execute various kinds of processing.

Furthermore, the storage device 13 stores map information MI. The map information MI indicates a position of an upward projecting object VP existing in the travel route RP in X-Y coordinates illustrated in FIG. 2, and is sectioned into map information pieces DTI of a plurality of sectioned regions DT as illustrated in FIG. 2. Furthermore, as illustrated in FIGS. 3 and 4, a map information piece DTI of each sectioned regions DT indicates X-Y coordinate positions of grids GR that section the map into square shapes each having a size of tens of centimeters in a planar view, and also indicate whether an upward projecting object VP exists in each of the grids GR. Each of the grids GR includes information on whether any upward projecting object VP exists, namely, information of 0 or 1. In the embodiment, as illustrated in FIGS. 3 and 4, in a case where there is an upward projecting object VP, each of the grids GR indicates existence thereof with a black square as "1" in the drawing, and in a case where there is no upward projecting object VP, each of the grids GR indicates absence thereof with a white square as "0" in the drawing.

Additionally, the map information MI is created on basis of a detection result of a distance measuring sensor installed in each of a plurality of dump trucks 2 and each different work machine 3 and adapted to detect a position of an object around a work machine per map information piece DTI of each sectioned region DT. More specifically, each map information piece DTI of each sectioned region DT is created every time each of various kinds of vehicles, namely, each dump truck 2 and each different work machine 3 travels along the travel route RP, or created every time a different work machine 3 such as a drone flies above each sectioned region DT. Each of the plurality of work machines 2 and 3 creates a map information piece DTI of a sectioned region DT around the own vehicle.

As illustrated in FIG. 5, the storage device 13 stores work machines 2 and 3 and created map information pieces DTI of sectioned regions DT in a correlated manner. In other words, the storage device 13 stores map information pieces DTI of sectioned regions DT for each of work machines 2 3 having created the map information pieces. In the embodiment, the storage device 13 stores three map information pieces DTI of a first sectioned region DT created by a first dump truck 2, stores three map information pieces DTI of a second sectioned region DT created by the first dump truck 2, stores three map information pieces DTI of the second sectioned region DT created by a second dump truck 2, and stores three map information pieces DTI of the first sectioned region DT created by a third dump truck 2.

Furthermore, the processing device 12 extracts a map information piece DTI of a sectioned region DT where each dump truck 2 currently exists and map information pieces DTI of a plurality of sectioned regions DT adjacent to and surrounding the sectioned region DT where each dump truck 2 currently exists from among map information pieces DTI of a plurality of sectioned regions DT of the map information MI stored in the storage device 13 on the basis of information related to a position of the dump truck 2. In the embodiment, the processing device 12 extracts a map information piece DTI of one sectioned region DT where each dump truck 2 currently exists and map information pieces DTI of eight surrounding sectioned regions DT. The processing device 12 transmits the extracted map information pieces DTI of the plurality of sectioned regions DT to each dump truck 2 via the radio communication device 18. In other words, the processing device 12 of the management device 10 transmits, to each dump truck 2, the map information piece DTI of the sectioned region DT where each dump truck 2 currently exists and the map information pieces DTI of the sectioned regions DT adjacent to the sectioned region DT where each dump truck 2 currently exists from among the plurality of sectioned regions DT of the map information MI.

The computer 11 includes at least the input/output unit 111 for communication (illustrated in FIG. 1), a central processing unit (CPU) to execute a control program, a read only memory (ROM) to store the control program, a random access memory (RAM) used as a work area of the CPU, and a nonvolatile memory in which information is registered by the CPU. The functions of the processing device 12 are implemented by the CPU reading the control program stored in the ROM and executing the same in the work area of the RAM. The functions of the storage device 13 are implemented by the ROM storing the control program and also by the CPU registering, in the nonvolatile memory, a map information piece DTI of each sectioned region DT constituting the map information MI. The nonvolatile memory includes at least one of a flash memory and a hard disk drive, and implements a database. Additionally, the functions of the processing device 12 and storage device 13 may also be implemented by cooperation of a plurality of processing circuits.

The display device 16 includes, for example, a flat panel display like a liquid crystal display. The display device 16 can display information related to a position of a dump truck 2 and information related to a position of a different work machine 3. The input device 17 includes at least one of a keyboard, a touch panel, and a mouse. The input device 17 functions as an operation unit capable of receiving an operation signal in the processing device 12.

The radio communication device 18 is disposed in the control facility 7. The radio communication device 18 is a part of the communication system 9. The radio communication device 18 is connected to the processing device 12 via the input/output unit 111. The radio communication device 18 has an antenna 18A. The radio communication device 18 can receive information transmitted from at least one of a dump truck 2 and a different work machine 3. The information received by the radio communication device 18 is output to the processing device 12 and stored (registered) in the storage device 13. The radio communication device 18 can transmit information to at least one of a dump truck 2 and a different work machine 3.

The GPS base station 19 is disposed in the control facility 7. The GPS base station 19 includes at least: an antenna 19A that receives information from the plurality of positioning satellites 5; and a transmitter/receiver 19B connected to the antenna 19A. The transmitter/receiver 19B includes at least: a receiver to receive information from a positioning satellite 5 via the antenna 19A; a transmitter to transmit information to a dump truck 2 via an antenna 19C; an arithmetic processing device including a microprocessor such as a central processing unit (CPU); and a storage device having a memory such as a read only memory (ROM) or a random access memory (RAM). The transmitter/receiver 19B detects, from information received via the antenna 19A, a GPS position obtained by the GPS base station 19, and also generates correction observation information to correct the GPS position of a dump truck 2. In the GPS base station 19, the transmitter/receiver 19B transmits the correction observation information to a dump truck 2 and a different work machine 3 through the antenna 19C.

Different Work Machine

Next, a different work machine 3 will be described. In the embodiment, the different work machine 3 is a work machine other than a dump truck 2. The different work machine 3 includes at least: a processing device including a central processing unit (CPU) and executing various kinds of processing related to work content; a GPS receiver to detect a GPS position; and a radio communication device to exchange information with the radio communication device 18 of the control facility 7. In the different work machine 3, the radio communication device transmits a GPS position to the radio communication device 18 of the control facility 7 at a predetermined time interval.

Additionally, the different work machine 3 includes a distance measuring sensor to detect a position of an object around the same, and detects a position of an upward projecting object VP on the basis of a detection result obtained by the distance measuring sensor, and when the different work machine 3 is moved to an adjacent sectioned region DT, the different work machine 3 transmits, to the management device 10, a position of an upward projecting object VP as a map information piece DTI of the sectioned region DT.

Dump Truck

Figure 6:
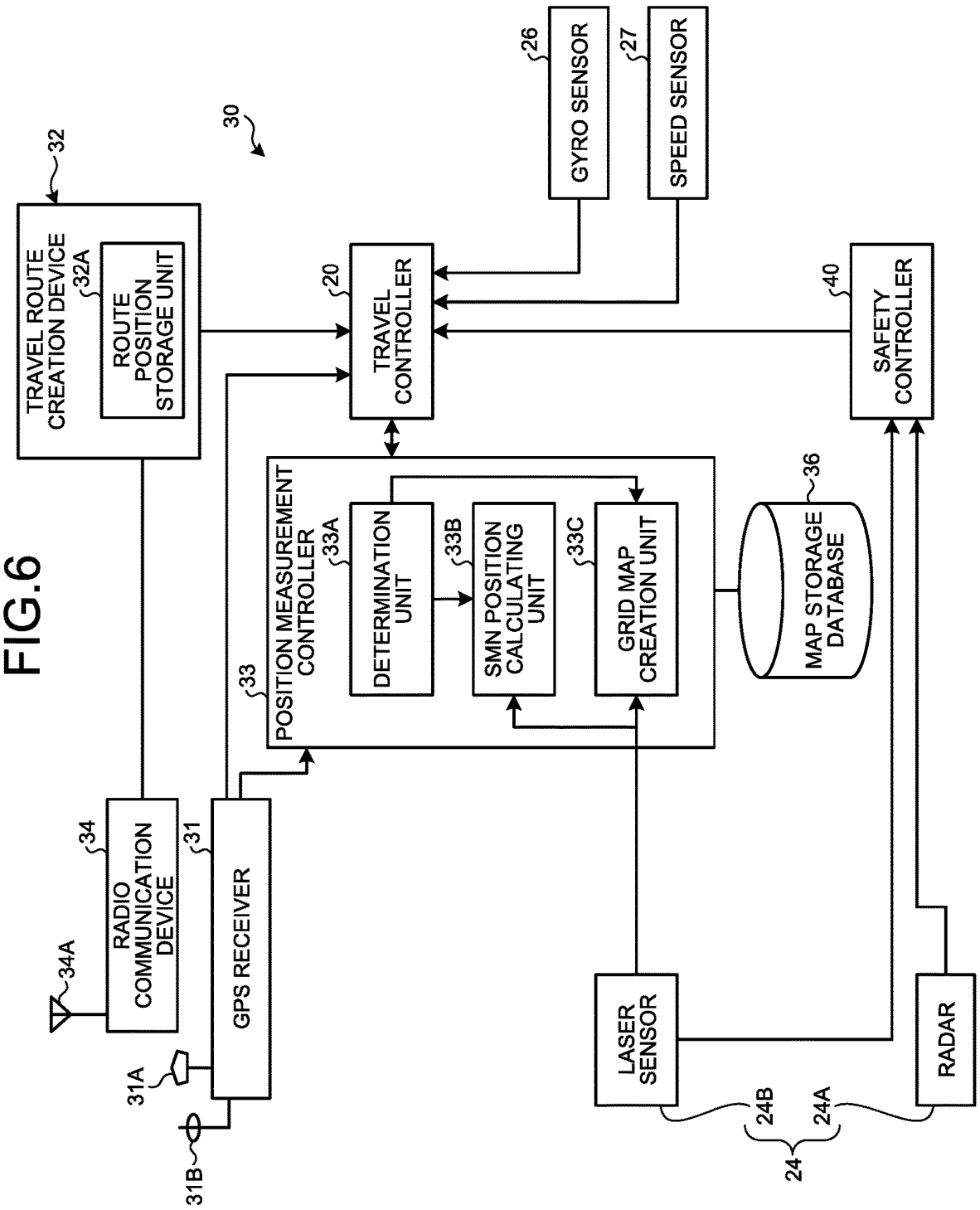
FIG. 6 is a control block diagram of a dump truck according to the embodiment.
Figure 7:
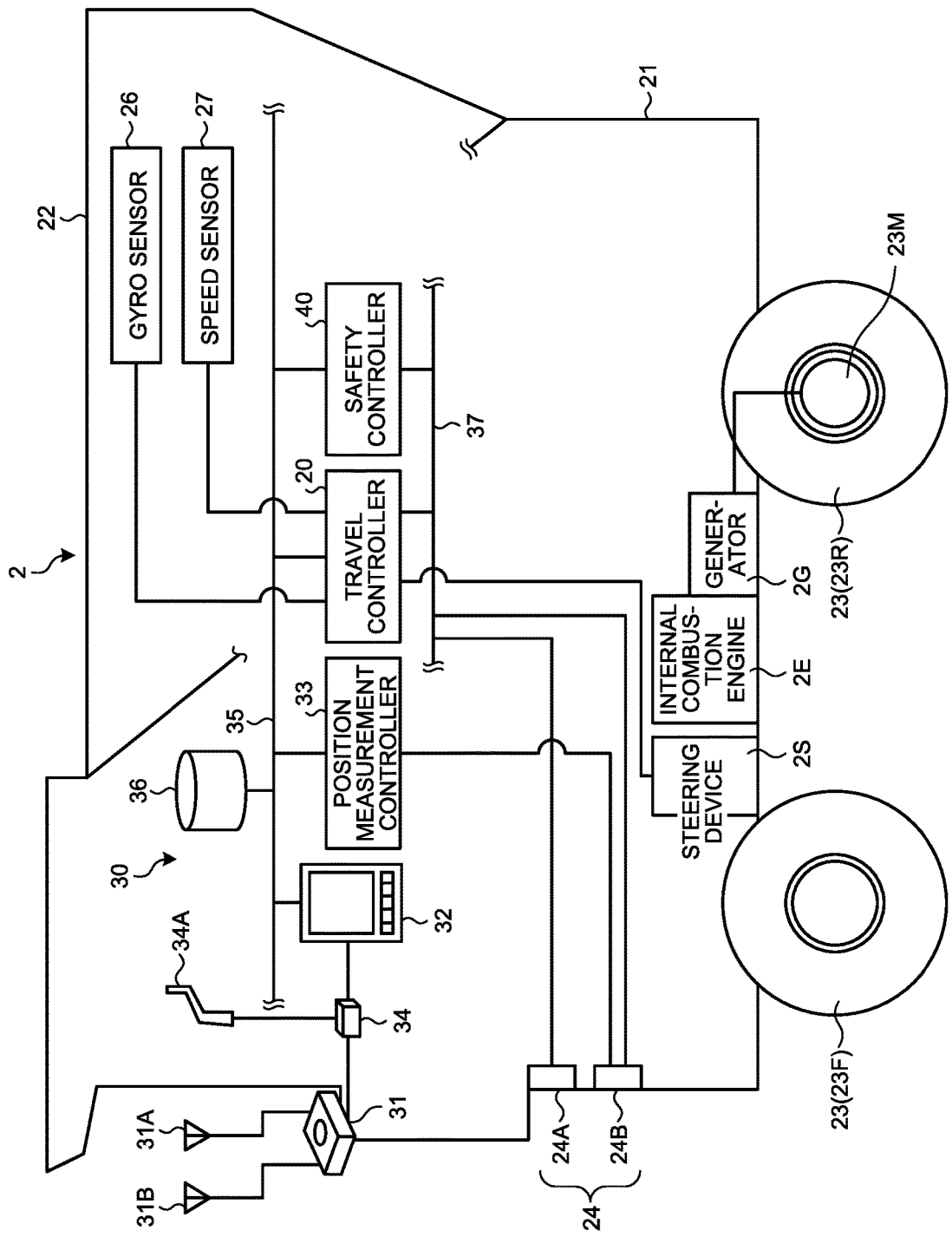
FIG. 7 is a hardware configuration diagram of the dump truck according to the embodiment.
Figure 8:
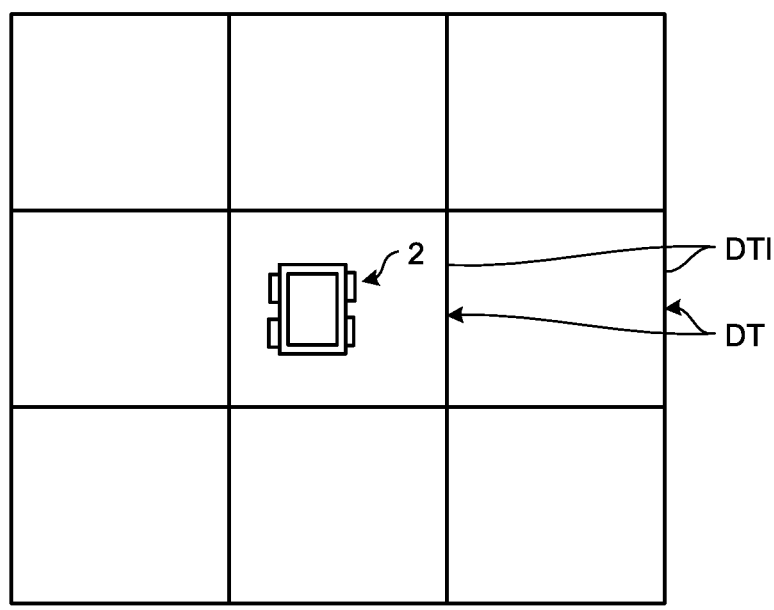
FIG. 8 is a diagram illustrating information related to sectioned regions stored in a map storage database of a dump truck according to the embodiment.

Next, a dump truck 2 will be described. FIG. 6 is a control block diagram of a dump truck according to the embodiment. FIG. 7 is a hardware configuration diagram of the dump truck according to the embodiment. FIG. 8 is a diagram illustrating information related to sectioned regions stored in the map storage database of the dump truck according to the embodiment.

As illustrated in FIG. 7, a dump truck 2 includes a vehicle body 21, a vessel 22, wheels 23, an obstacle sensor 24, and a navigation system 30. The vehicle body 21 travels on a travel route RP. The vehicle body 21 is provided with an internal combustion engine 2E like a diesel engine, a generator 2G actuated by the internal combustion engine 2E, and an electric motor 23M actuated by electric power generated by the generator 2G. Rear wheels 23R out of the wheels 23 are driven by the electric motor 23M. Meanwhile, power of the internal combustion engine 2E may be transmitted to the rear wheels 23R via a transmission including a torque converter. Additionally, the vehicle body 21 includes a steering device 2S to steer the front wheels 23F out of the wheels 23. On the vessel 22, matters to be loaded are loaded by a loading machine, and the vessel is lifted to discharge the loaded matters in discharging work.

The obstacle sensor 24 is disposed at a lower portion of a front portion of the vehicle body 21. The obstacle sensor 24 detects an obstacle ahead of the vehicle body 21 in a non-contact manner. In the embodiment, the obstacle sensor 24 includes: a plurality of radars 24A functioning as distance measuring sensors; and a laser sensor 24B functioning as a distance measuring sensor. Each radar 24A detects a position of an object around a dump truck 2, emits radio waves to irradiate an obstacle with the radio waves, and receives radio waves reflected by the obstacle. Thus, the radar 24A can detect a direction and a distance of the obstacle with respect to the radar 24A.

The laser sensor 24B detects a position of an object around a dump truck 2, emits laser beams to irradiate an obstacle with the laser beams, and receives laser beams reflected by the obstacle. Thus, the laser sensor 24B can detect a direction and a distance of the obstacle with respect to the laser sensor 24B. The laser sensor 24B has resolution performance higher than resolution performance of the radar 24A because the laser sensor 24B emits laser beams and receives reflected laser beams.

Additionally, the radar 24A and the laser sensor 24B are connected to a second communication line 37 of the navigation system 30. Furthermore, the laser sensor 24B is connected to a position measurement controller 33 of the navigation system 30.

Navigation System

Next, the navigation system will be explained. The navigation system 30 is installed in a dump truck 2 and causes the dump truck 2 to autonomously travel along the travel route RP. As illustrated in FIG. 7, the navigation system 30 includes at least a gyro sensor 26, a speed sensor 27, a GPS receiver 31, a travel route creation device 32, the position measurement controller 33, a travel controller 20, the laser sensor 24B, a radio communication device 34, and a map storage database 36. Besides these, the navigation system 30 includes a first communication line 35, the second communication line 37, and a safety controller 40.

As illustrated in FIG. 7, the travel controller 20, travel route creation device 32, position measurement controller 33, map storage database 36, and safety controller 40 are connected to the first communication line 35. These components exchange information by performing mutual communication via the first communication line 35. The travel controller 20 and the safety controller 40 are also connected to the second communication line 37. These components exchange information by performing mutual communication via the second communication line 37. In the embodiment, the communication standards using the first communication line 35 and the second communication line 37 correspond to a controller area network (CAN) standardized as ISO 11898 and ISO 11519, but not limited thereto.

The gyro sensor 26 detects an azimuth direction of a dump truck 2 (change amount in azimuth direction). The gyro sensor 26 is connected to the travel controller 20. The gyro sensor 26 outputs, to the travel controller 20, a detected signal that is a detection result. The travel controller 20 can obtain an azimuth direction (change amount in azimuth direction) of a dump truck 2 on the basis of a detection signal obtained by the gyro sensor 26.

The speed sensor 27 detects a travel speed of a dump truck 2. In the embodiment, the speed sensor 27 detects a rotation speed of the wheels 23 to detect the travel speed of the dump truck 2. The speed sensor 27 is connected to the travel controller 20. The speed sensor 27 outputs, to the travel controller 20, a detection signal that is a detection result. The travel controller 20 can obtain a moved distance of a dump truck 2 on the basis of a detection signal from the speed sensor 27 and time information from a timer built inside the travel controller 20.

The GPS receiver 31 is a position detecting unit to detect a GPS position of a dump truck 2 by using a GPS. The GPS receiver 31 is connected at least to: an antenna 31A that receives information from a positioning satellite 5; and an antenna 31B that receives correction observation information from the GPS base station 19. The antenna 31A outputs, to the GPS receiver 31, a signal based on information received from a positioning satellite 5, and the antenna 31B outputs, to the GPS receiver 31, a signal based on received correction observation information. The GPS receiver 31 detects a position (GPS position) of the antenna 31A by using information from a positioning satellite 5 and correction observation information from the GPS base station 19. More specifically, the GPS receiver 31 obtains a distance to an arbitrary positioning satellite 5 by comparing information from the positioning satellite 5 with correction observation information from the GPS base station 19, and checks a phase of a radio wave from the positioning satellite 5 to detect a position (GPS position) of the antenna 31A. In the embodiment, the GPS receiver 31 uses a real time kinematic (RTK)-GNSS, but not limited thereto.

The GPS receiver 31 detects a GPS position of a dump truck 2 by detecting a position of an antenna 31A (GPS position). Additionally, in the course of detecting the position of the antenna 31A, the GPS receiver 31 detects a fix solution, a float solution, or a single solution to indicate detection accuracy of a GPS position on the basis of, for example, the number of the positioning satellites 5 from which the antenna 31A has received information. In a case where positioning calculation for a GPS position is impossible, the GPS receiver 31 outputs a signal indicating a non-positioning state. In the embodiment, a GPS position of a fix solution has accuracy corresponding to accuracy with which a dump truck 2 can perform autonomous travel, and a GPS position of a float solution and a GPS position of a single solution have accuracy corresponding to accuracy with which the dump truck 2 cannot perform autonomous travel. Thus, the GPS receiver 31 detects a fix solution, a float solution, or a single solution indicating accuracy of a detected GPS position, and in a case where positioning calculation is impossible, the GPS receiver 31 outputs a signal indicating a non-positioning state to the travel controller 20 and the position measurement controller 33 via the travel route creation device 32.

As illustrated in FIG. 6, the travel route creation device 32 includes a route position storage unit 32A that is a route position storing unit to store travel route information generated by the processing device 12 of the management device 10. The travel route creation device 32 is connected to the radio communication device 34 to which an antenna 34A is connected. The radio communication device 34 can receive information (including a command signal) transmitted from at least one of the management device 10 and a work machine 4 other than the own vehicle. Note that the work machine 4 other than the own vehicle includes a work machine 4 other than a dump truck 2 in which the navigation system 30 is installed, such as a boring machine, an excavating machine, a loading machine, a hauling machine, and a vehicle driven by a worker. In other words, the work machine 4 other than the own vehicle includes a dump truck 2 other than the own vehicle.

Additionally, the radio communication device 34 receives map information pieces DTI of a plurality of sectioned regions DT transmitted from the radio communication device 18 of the control facility 7, and outputs the same to the position measurement controller 33 via the travel route creation device 32 or the like.

The travel controller 20 is a computer including at least a central processing unit (CPU), a read only memory (ROM) to store a control program, a random access memory (RAM) used as a work area of the CPU, and a nonvolatile memory. The travel controller 20 receives a GPS position detected by the GPS receiver 31 and a position of a dump truck 2 detected by the position measurement controller 33. The travel controller 20 is a travel control unit to cause a dump truck 2 to autonomously travel along the travel route RP on the basis a GPS position of the dump truck 2 detected by the GPS receiver 31 and a position of the dump truck 2 detected by an SMN position calculating unit 33B of the position measurement controller 33.

Besides the position of the dump truck 2, the travel controller 20 receives: a detection signal indicating an azimuth direction (change amount in azimuth direction) of the dump truck 2 that is a detection result obtained by the gyro sensor 26; and a detection signal indicating a travel speed of the dump truck 2 that is a detection result obtained by the speed sensor 27. Furthermore, the travel controller 20 is connected to the GPS receiver 31 via the radio communication device 34, travel route creation device 32, and first communication line 35. The travel controller 20 receives a detection signal indicating a GPS position that is a detection result obtained by the GPS receiver 31.

The travel controller 20 detects a position and an azimuth direction of a dump truck 2 on the basis of: a GPS position that is a detection result obtained by the GPS receiver 31; a travel speed of the dump truck 2 that is a detection result obtained by the speed sensor 27; and an azimuth direction (change amount in azimuth direction) of the dump truck 2 that is a detection result obtained by the gyro sensor 26.

The travel controller 20 controls at least one of an accelerator, a braking device not illustrated, and a steering device 2S of the dump truck 2 such that a position of the dump truck 2 coincides with a position of the travel route RP included in the travel route information, in other words, the dump truck 2 travels along the travel route RP. With such control, the travel controller 20 causes the dump truck 2 to travel along the travel route RP. The functions of the travel controller 20 are implemented by the CPU reading the control program stored in the ROM, and executing the program in the work area of the RAM. Additionally, the functions of the travel controller 20 may also be implemented by cooperation of a plurality of processing circuits.

As illustrated in FIG. 6, the position measurement controller 33 includes a determination unit 33A, the scan matching navigation (SMN) position calculating unit 33B, and a grid map creation unit 33C. The position measurement controller 33 is a measurement output unit to detect a position of a dump truck 2 by matching a map information piece DTI of a sectioned region DT received from the management device 10 and stored in the map storage database 36 with a detection result obtained by the laser sensor 24B. Furthermore, the position measurement controller 33 detects a position of an upward projecting object VP (mainly a bank BK in the embodiment) from a GPS position of the dump truck 2 that is a detection result obtained by the GPS receiver 31 and a detection result obtained by the laser sensor 24B, and stores the detected position of the upward projecting object VP in the map storage database 36 as a map information piece DTI of a sectioned region DT constituting the map information MI. The position measurement controller 33 stores, in the map storage database 36, a map information piece DTI of a sectioned region DT received by the radio communication device 34.

The position measurement controller 33 is connected to the first communication line 35. The position measurement controller 33 receives, via the first communication line 35 and the travel controller 20: a detection signal indicating an azimuth direction (change amount in azimuth direction) of a dump truck 2 that is a detection result obtained by the gyro sensor 26; and a detection signal indicating a travel speed of the dump truck 2 that is a detection result obtained by the speed sensor 27. Furthermore, the position measurement controller 33 is connected to the GPS receiver 31 via the radio communication device 34, travel route creation device 32, and first communication line 35. The position measurement controller 33 receives a detection signal indicating a GPS position that is a detection result obtained by the GPS receiver 31.

The determination unit 33A is a determining unit to determine whether a position of a dump truck 2 is moved from one sectioned region DT to a sectioned region DT adjacent to the one sectioned region DT on the basis of a GPS position detected by the GPS receiver 31 or a position of the dump truck 2 detected by the SMN position calculating unit 33B. In the embodiment, the determination unit 33A determines whether a dump truck 2 is moved to an adjacent sectioned region DT by confirming, in the sectioned region DT, a GPS position detected by the GPS receiver 31 and a position of the dump truck 2 detected by the SMN position calculating unit 33B. Additionally, the determination unit 33A is a determining unit to determine whether an error of a GPS position detected by the GPS receiver 31 is a predetermined error or less. In the embodiment, the determination unit 33A determines whether a solution of a GPS position is a fix solution, and in the case where the solution of the GPS position is a fix solution, it is determined that accuracy of the detected GPS position of the dump truck 2 is highly accurate and an error of the GPS position is the predetermined error or less. In a case where a solution of a GPS position is a float solution or a single solution or in a case where a GPS position is in a non-positioning state, the determination unit 33A determines that: accuracy of the detected GPS position of the dump truck 2 has low accuracy; and an error of the GPS position exceeds the predetermined error. Meanwhile, the predetermined error corresponds to an error (accuracy) of a GPS position with which the dump truck 2 can autonomously travel along the travel route RP by dead reckoning navigation described later. In the embodiment, the GPS receiver 31 detects a GPS position and a solution, but another device (e.g., the determination unit 33A) may also detect a solution.

When the determination unit 33A determines that an error of a GPS position of the dump truck 2 detected by the GPS receiver 31 is the predetermined error or less, the grid map creation unit 33C, namely, the position measurement controller 33 detects a position of at least one or more upward projecting objects VP located outside the loading place LPA, outside the discharging place DPA, and outside the hauling path HL on the basis of a detection result obtained by the gyro sensor 26, a detection result obtained by the speed sensor 27, and a detection result obtained by the laser sensor 24B, and stores information related to the position of the upward projecting object VP in the map storage database 36 as a map information piece DTI of a sectioned region DT. More specifically, the grid map creation unit 33C integrates a position and an azimuth direction of the dump truck 2 and a detection result obtained by the laser sensor 24B, and detects a position of an upward projecting object VP by deleting a detection result other than the upward projecting object VP from the integrated information.

The map storage database 36 is map information storing unit to store part of map information pieces DTI of sectioned regions DT out of map information pieces DTI of a plurality of sectioned regions DT of map information MI, and is connected to the first communication line 35. The map storage database 36 includes at least one of a random access memory (RAM), a read only memory (ROM), a flash memory, and a hard disk drive. The map storage database 36 stores part of map information pieces DTI of sectioned regions DT received in the position measurement controller 33 from the management device 10. More specifically, the map storage database 36 stores a map information piece DTI of a sectioned region DT where each dump truck 2 currently exists and map information pieces DTI of a plurality of sectioned regions DT adjacent to and surrounding the sectioned region DT where each dump truck 2 currently exists In the embodiment, as illustrated in FIG. 8, the map storage database 36 stores a map information piece DTI of one sectioned region DT where each dump truck 2 currently exists and map information pieces DTI of eight sectioned regions DT adjacent to and surrounding the one sectioned region DT.

Furthermore, when the determination unit 33A determines that an error of a GPS position of the dump truck 2 detected by the GPS receiver 31 is the predetermined error or less, the map storage database 36 extracts a detection result related to an upward projecting object VP at least from a detection result obtained by the laser sensor 24B, and overwrites an already-stored map information piece DTI of a sectioned region DT with the extracted detection result related to the upward projecting object VP as the map information piece DTI of the sectioned region DT.

In a case where the determination unit 33A determines that an error of a GPS position of the dump truck 2 detected by the GPS receiver 31 exceeds the predetermined error, the SMN position calculating unit 33B, namely, the position measurement controller 33 detects a position and an azimuth direction of the dump truck 2 on the basis of a detection result obtained by the laser sensor 24B and a map information piece DTI of a sectioned region DT received from the management device 10 and stored in the map storage database 36. In other words, when the determination unit 33A determines that the error of the GPS position detected by the GPS receiver 31 exceeds the predetermined error, the position measurement controller 33 detects a position of the dump truck 2 by matching the detection result obtained by the laser sensor 24B with the map information piece DTI of the sectioned region DT stored in the map storage database 36. The SMN position calculating unit 33B integrates a detection result obtained by the gyro sensor 26, a detection result obtained by the speed sensor 27, a detection result obtained by the laser sensor 24B, and a map information piece DTI of a sectioned region DT stored in the map storage database 36 with a known particle filter (PF), and detects a position and an azimuth direction of the dump truck 2.

Additionally, when the determination unit 33A determines that a position of the dump truck 2 is moved from one sectioned region DT to a sectioned region DT adjacent to the one sectioned region DT, the position measurement controller 33 transmits, to the management device 10, a request information to request a map information piece DTI of a different sectioned region DT adjacent to the adjacent sectioned region DT together with information related to the position of a dump truck 2. Furthermore, when the determination unit 33A determines that a position of the dump truck 2 is moved from one sectioned region DT to a sectioned region DT adjacent to the one sectioned region DT, the position measurement controller 33 transmits, to the management device 10, a position of an upward projecting object VP detected by the laser sensor 24B as a map information piece DTI of a sectioned region DT.

The position measurement controller 33 is a computer that includes at least an input/output unit for communication, a central processing unit (CPU) to execute a control program, a read only memory (ROM) to store the control program, a random access memory (RAM) used as a work area of the CPU, and a nonvolatile memory. The functions of the determination unit 33A, SMN position calculating unit 33B, and grid map creation unit 33C are implemented by the CPU reading the control program stored in the ROM and executing the same in the work area of the RAM. Additionally, the functions of the determination unit 33A, SMN position calculating unit 33B, and grid map creation unit 33C may also be implemented by cooperation of a plurality of processing circuits.

The safety controller 40 obtains a relative position between a dump truck 2 and an obstacle on the basis of detection signals from the radar 24A and the laser sensor 24B, and outputs the relative position to the travel controller 20. The travel controller 20 generates a command to control at least one of the accelerator, the braking device not illustrated, and the steering device 2S by using the relative position with respect to the obstacle, controls the dump truck 2 on the basis of the command, and prevents the dump truck 2 from colliding with the object.

Additionally, the travel controller 20 outputs a command to control the braking device not illustrated and causes the travel controller 20 to stop the vehicle body 21 in the case where a solution of a GPS position is a float solution or a single solution or in a case where a GPS position continues to be a non-positioning state for a predetermined time or more and the SMN position calculating unit 33B can acquire only a detection result from the laser sensor 24B with estimated accuracy and reliability lower than a predetermined value and predetermined reliability with reference to the map information MI stored in the map storage database 36.

Operation of Management System

Figure 9:
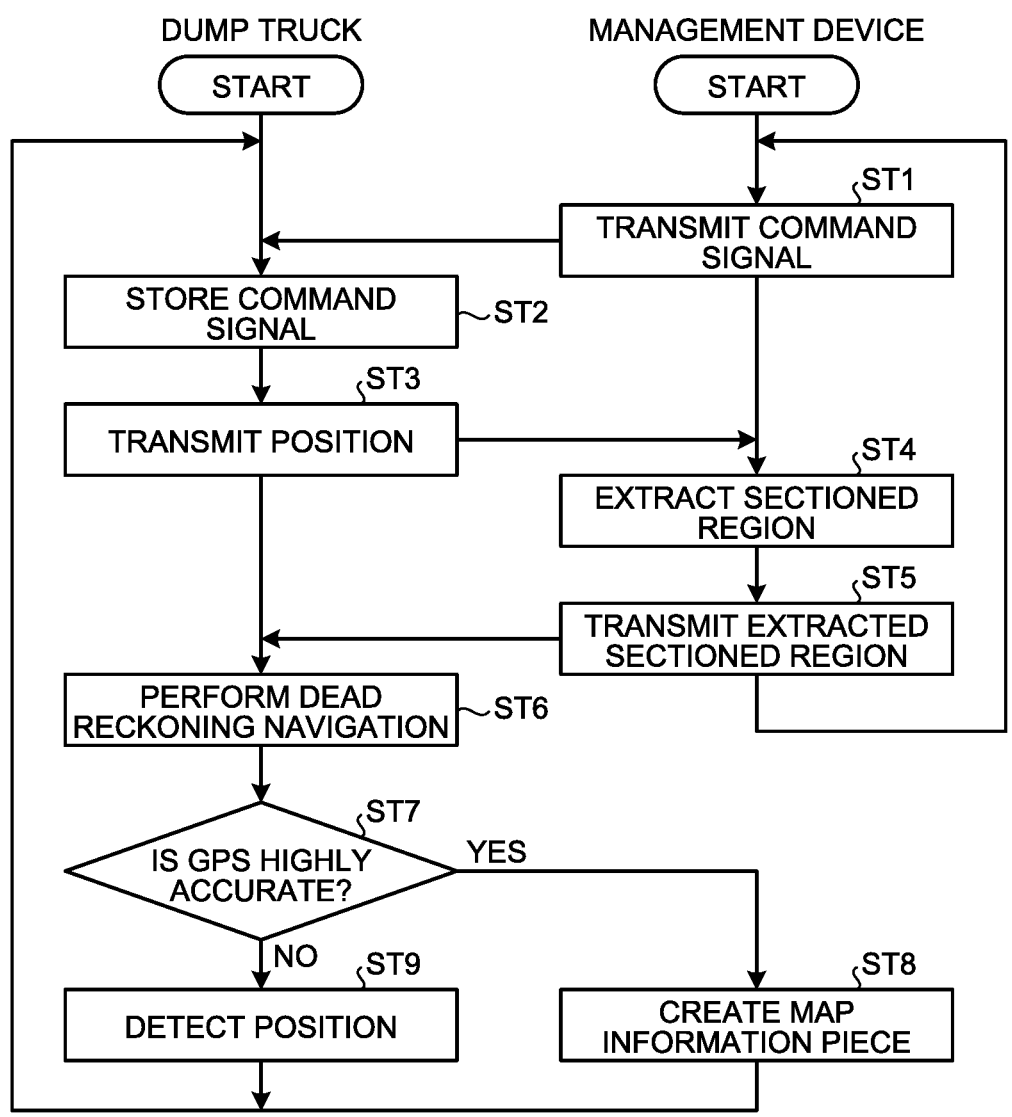
FIG. 9 is an exemplary flowchart of the management system according to the embodiment.
Figure 10:
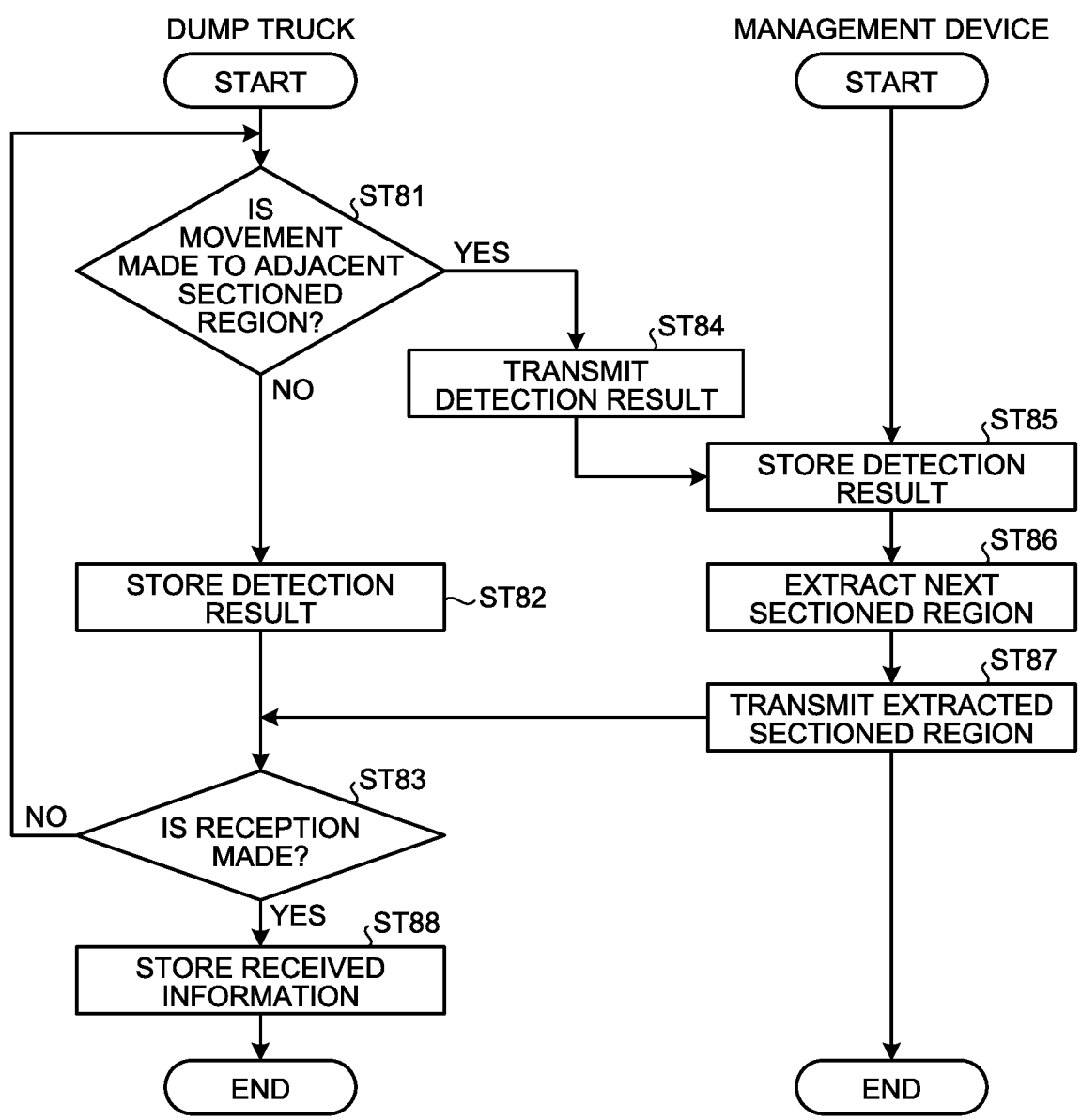
FIG. 10 is an exemplary flowchart of step ST8 in FIG. 9.
Figure 11:
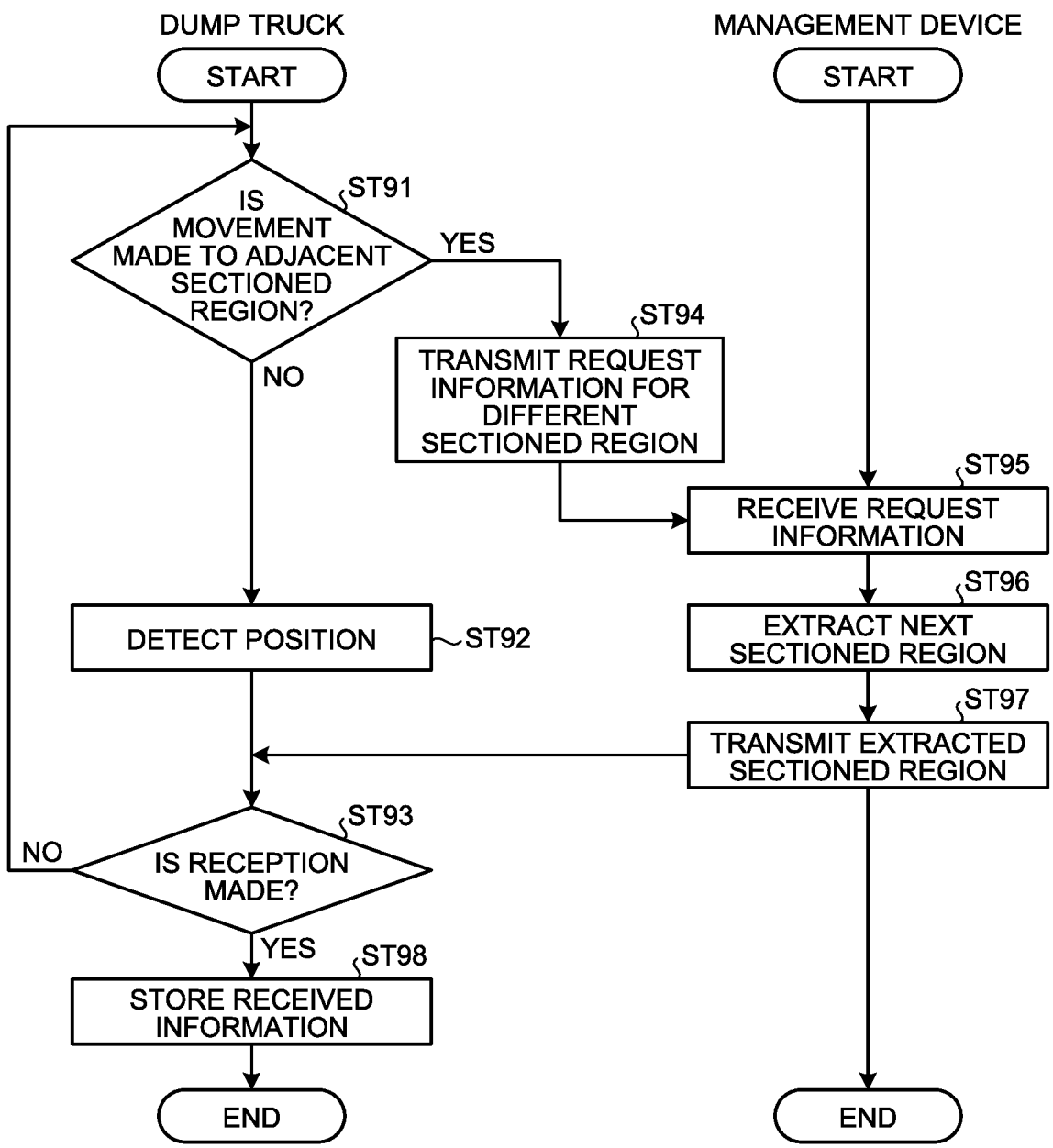
FIG. 11 is an exemplary flowchart of step ST9 in FIG. 9.
Figure 12:
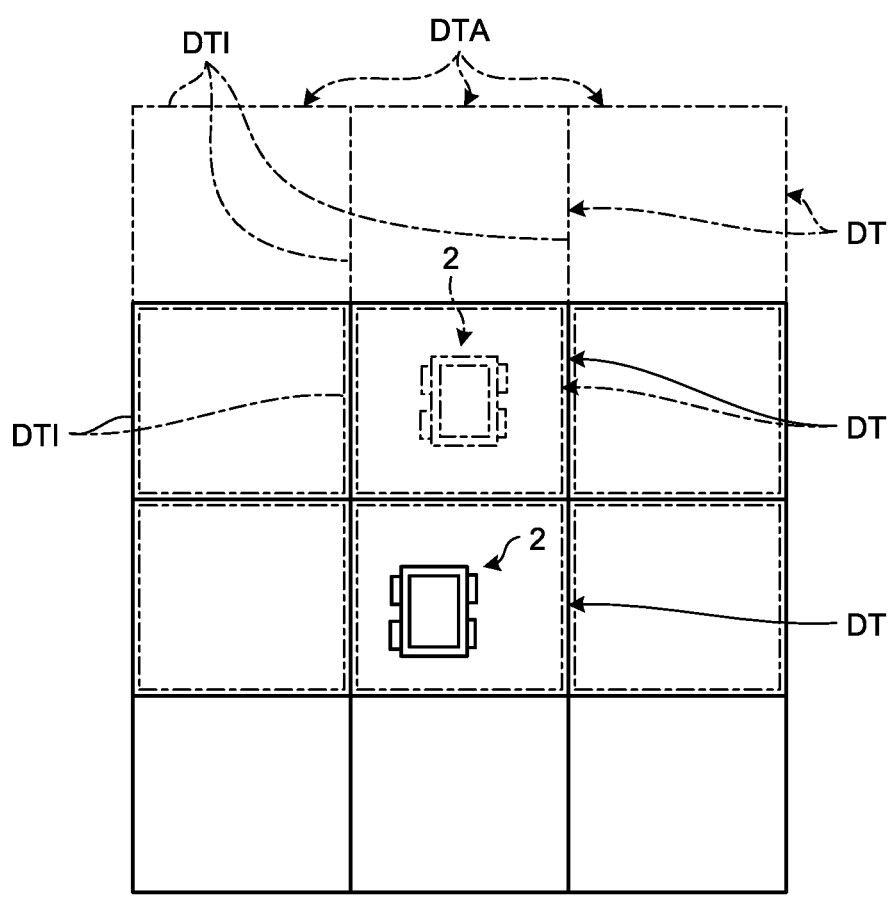
FIG. 12 is a diagram illustrating exemplary sectioned regions stored in the map storage database in step ST84 of FIG. 10 and step ST94 of FIG. 11.

Next, exemplary operation of the management system 1 according to the embodiment will be described. FIG. 9 is an exemplary flowchart of the management system according to the embodiment. FIG. 10 is an exemplary flowchart of step ST8 in FIG. 9. FIG. 11 is an exemplary flowchart of step ST9 in FIG. 9. FIG. 12 is a diagram illustrating exemplary sectioned regions stored in the map storage database in step ST84 of FIG. 10 and step ST94 of FIG. 11.

In the management system 1, the management device 10 first transmits a command signal to a travel route creation device 32 and a position measurement controller 33 of a dump truck 2 via the radio communication device 18 (step ST1). The command signal includes information related to travel conditions of the dump truck 2. Preferably, the command signal further includes information related to a position of a work machine 4 other than the own vehicle. The information related to the travel conditions includes travel route information generated by the processing device 12 and information related to a travel speed of the dump truck 2. The travel route creation device 32 stores, in a route position storage unit 32A, the travel route information and the information related to the position of the work machine 4 other than the own vehicle out of the command signal from the computer 11 transmitted via the communication system 9 (step ST2). When the travel route creation device 32 receives the command signal including the travel route information from the processing device 12, a position measurement controller 33 transmits, to the management device 10, information related to a position and an azimuth direction of the dump truck 2 that is the own vehicle via a radio communication device 34 (step ST3).

On the basis of the information related to the position of the dump truck 2, the management device 10 extracts, from map information pieces DTI of a plurality of sectioned regions DT stored in the storage device 13, a map information piece DTI of a sectioned region DT where the dump truck 2 currently exists and map information pieces DTI of a plurality of different sectioned regions DT adjacent to and surrounding the sectioned region DT where the dump truck 2 currently exists (step ST4). More specifically, the management device 10 extracts, from the map information pieces DTI of the plurality of sectioned regions DT stored in the storage device 13: a map information piece DTI of a sectioned region DT previously created by the dump truck 2 itself to which a map information piece DTI of a sectioned region DT is to be transmitted; a map information piece DTI of a sectioned region DT created by a dump truck 2 that is the same vehicle type of the dump truck 2 to which a map information piece DTI of a sectioned region DT is to be transmitted; a latest map information piece DTI of a sectioned region DT; a map information piece DTI of a sectioned region DT having an appropriate data amount; a map information piece DTI of a sectioned region DT created under the conditions with little error frequency; or a map information piece DTI of a sectioned region DT created in weather similar to current weather.

In a case where a plurality of map information pieces DTI is stored for the extracted sectioned region DT, the management device 10 extracts a predetermined map information piece DTI from the plurality of map information pieces DTI by adding weights or providing priorities to each of the above-listed map information pieces. For example, among the map information pieces DTI of the plurality of sectioned regions DT, it is preferable that the management device 10 adds a highest weight to prioritize a map information piece DTI created by each dump trunk 2 itself. Next, among the map information pieces DTI of the plurality of sectioned regions DT, it is preferable that the management device 10 adds a high weight to prioritize a map information piece DTI having a short elapsed time after being created. Among the plurality of sectioned regions DT, it is preferable that the management device 10 preferentially extracts a latest map information piece DTI created by each dump trunk 2 itself.

Additionally, the management device 10 may simply provide a first priority to a latest map information piece DTI created by each dump trunk 2 itself, and in a case where there is no map information piece DTI created by each dump trunk 2 itself, the management device 10 may extract a latest map information piece DTI created by a different work machine 3. Additionally, among the plurality of sectioned regions DT, the management device 10 may provide s first priority to a latest map information piece DTI. Besides these examples, the management device 10 may further provide a high priority to a map information piece DTI of a common machine model, or may provide high priority to a map information piece DTI having little error when the map information piece is created.

The management device 10 transmits extracted map information pieces DTI of the plurality of sectioned regions DT (nine in this embodiment) to the dump truck 2 (step ST5). In the embodiment, among the map information pieces DTI of the plurality of sectioned regions DT, it is preferable that the management device 10 preferentially extracts a map information piece DTI of a sectioned region DT previously created by each dump truck 2 itself in step ST4, and transmits the same to each dump truck 2 in step ST5. Additionally, in the embodiment, it is preferable that, in step ST4, the management device 10 preferentially extracts, from among the map information pieces DTI of the plurality of sectioned regions DT, a map information piece DTI of a sectioned region DT having a short elapsed time after being created, and transmits the same to each dump truck 2 in step ST5.

The position measurement controller 33 of the navigation system 30 stores, in the map storage database 36, the map information pieces DTI of the plurality of sectioned regions DT received by the radio communication device 34, and the travel controller 20 causes the dump truck 2 to travel along the travel route RP by the dead reckoning navigation on the basis of a GPS position of the dump truck 2 detected by the GPS receiver 31 (step ST6). In the embodiment, the travel controller 20 causes the dump truck 2 to travel at least in part of the loading place LPA, discharging place DPA, hauling path HL, and intersection IS in accordance with the travel conditions that includes the travel route information generated by the processing device 12 of the management device 10 and a travel speed (target travel speed) set by the processing device 12. The dead reckoning navigation is a navigation in which a current position of an object (dump truck 2) is estimated on the basis of an azimuth direction (change amount in azimuth direction) and a moved distance from a known position. The azimuth direction (change amount in azimuth direction) of the dump truck 2 is detected by using the gyro sensor 26 disposed in the dump truck 2. The moved distance of the dump truck 2 is detected by using the speed sensor 27 disposed in the dump truck 2. A detection signal from the gyro sensor 26 and a detection signal from the speed sensor 27 are output to the travel controller 20 of the dump truck 2.

The travel controller 20 can obtain an azimuth direction (change amount in azimuth direction) of the dump truck 2 from a known start point on the basis of a detection signal from the gyro sensor 26. The travel controller 20 can obtain a moved distance of the dump truck 2 from the known start point on the basis of a detection signal from the speed sensor 27. The travel controller 20 controls a control amount related to travel of the dump truck 2 on the basis of a detection signal from the gyro sensor 26 and a detection signal from the speed sensor 27 such that the dump truck 2 travels along the generated travel route RP. The control amount includes an accelerator signal, a braking signal, and a steering signal. The travel controller 20 controls travel (operation) of the dump truck 2 on the basis of the steering signal, accelerator signal, and braking signal.

Next, a description will be provided for an example in which a dump truck 2 travels while an estimated position obtained by the dead reckoning navigation is corrected by using the RTK-GNSS or SMN position calculating unit 33B. When a travel distance of the dump truck 2 becomes long, an error may be caused between an estimated position (position estimated) and an actual position due to accumulation of detection errors of one or both of the gyro sensor 26 and the speed sensor 27. As a result, the dump truck 2 may travel in a manner deviated from the travel route RP generated by the processing device 12. In the embodiment, the travel controller 20 causes the dump truck 2 to travel while correcting, by using a GPS position detected by the GPS receiver 31 and a position detected by the SMN position calculating unit 33B, a position (estimated position) of the dump truck 2 derived (estimated) by the dead reckoning navigation. The travel controller 20 calculates a control amount related to travel of the dump truck 2, including a correction amount to correct a position of the dump truck 2, on the basis of a detection signal from the gyro sensor 26, a detection signal from the speed sensor 27, a GPS position from the GPS receiver 31, or a position detected by the SMN position calculating unit 33B, such that the dump truck 2 travels along the travel route RP. The travel controller 20 controls travel (operation) of the dump truck 2 on the basis of the calculated correction amount and control amount such that the dump truck 2 travels along the travel route RP.

The determination unit 33A of the position measurement controller 33 determines whether an error of a GPS position of the dump truck 2 detected by the GPS receiver 31 is the predetermined error or less (step ST7). In other words, in step ST7, the determination unit 33A of the position measurement controller 33 determines whether accuracy of the GPS position of the dump truck 2 detected by the GPS receiver 31 is highly accurate. More specifically, the determination unit 33A of the position measurement controller 33 determines whether a solution of the GPS position detected by the GPS receiver 31 is a fix solution.

When the determination unit 33A of the position measurement controller 33 determines that the solution of the GPS position detected by the GPS receiver 31 is a fix solution, in other words, an error of the GPS position of the dump truck 2 detected by the GPS receiver 31 is the predetermined error or less (step ST7: Yes), the grid map creation unit 33C creates a map information piece DTI of a sectioned region DT (step ST8). In other words, in a case of determining that the error of the GPS position detected by the GPS receiver 31 is the predetermined error or less, the position measurement controller 33 causes the dump truck 2 to autonomously travel along the travel route RP stored in the route position storage unit 32A on the basis of the GPS position of the dump truck 2 detected by the GPS receiver 31, also extracts a detection result related to an upward projecting object VP from a detection result obtained by the laser sensor 24B, and stores the extracted detection result related to the upward projecting object VP as a map information piece DTI of a sectioned region DT (step ST8) in a map storing database 36, and the processing returns to step ST1.

More specifically, in step ST8, the determination unit 33A of the position measurement controller 33 determines whether a position of the dump truck 2 is moved from one sectioned region DT to a sectioned region DT adjacent to the one sectioned region DT (Step ST81). In a case of determining that the position of the dump truck 2 is not moved from the one sectioned region DT to a sectioned region DT adjacent to the one sectioned region DT (step ST81: No), the position measurement controller 33 extracts a detection result related to an upward projecting object VP from a detection result obtained the laser sensor 24B, and overwrites a map information piece DTI of a sectioned region DT stored in the map storing database 36 with the extracted detection result related to the upward projecting object VP as the map information piece DTI of the sectioned region DT (Step ST82). The position measurement controller 33 determines whether any new map information piece DTI of a sectioned region DT is received from the management device 10 (step ST83). In a case where the map information piece DTI of the sectioned region DT stored in the map storing database 36 is overwritten, the position measurement controller 33 determines that no new map information piece DTI of the sectioned region DT is received from the management device 10 (step ST83: No), and the processing returns to step ST81. Until a new map information piece DTI of a sectioned region DT is received from the management device 10, in other words, until the dump truck 2 is moved to a sectioned region DT adjacent to the one sectioned region DT, the position measurement controller 33 repeats the processing from step ST81 to step ST83, extracts a detection result related to an upward projecting object VP from a detection result of the laser sensor 24B, and overwrites the map information piece DTI of the sectioned region DT stored in the map storing database 36 with the extracted detection result related to the upward projecting object VP as the map information piece DTI of the sectioned region DT.

In a case where the determination unit 33A determines that the position of the dump truck 2 is moved from one sectioned region DT to a sectioned region DT adjacent to the one sectioned region DT (step ST81: Yes), the position measurement controller 33 transmits, to the management device 10: the map information piece DTI of the sectioned region DT that has been stored and overwritten in the map storing database 36; and a request information to request a map information piece DTI of a different sectioned region DT adjacent to the sectioned region DT where the dump truck 2 currently exists, namely, the above-described adjacent sectioned region DT, together with information related to a position of the dump truck 2 (step ST84). In the embodiment, the position measurement controller 33 transmits, to the management device 10, a map information piece DTI of the one sectioned region DT where overwriting has been performed by repeating the processing from step ST81 to step ST83 and the dump truck 2 has existed immediately before.

When the computer 11 of the management device 10 receives the received map information piece DTI of the sectioned region DT and request information together with the information related to the position of the dump truck 2, the computer 11 stores the same in the storage device 13 in a manner correlated to each dump truck 2 (step ST85). Similar to step ST4, the computer 11 of the management device 10 extracts, on the basis of the received information related to the position of the dump truck 2, a map information piece DTI of a sectioned region DT where the dump truck 2 currently exists and map information pieces DTI of a plurality of different sectioned regions DT adjacent to and surrounding the sectioned region DT where the dump truck 2 currently exists from among the map information pieces DTI of the plurality of sectioned regions DT stored in the storage device 13 (step ST86). Similar to step ST5, the management device 10 transmits the extracted map information pieces DTI of the plurality of sectioned regions DT (nine in this embodiment) to the dump truck 2 (step ST87).

In this case, in step ST84, the different sectioned region DT for which the position measurement controller 33 transmits the request information to the management device 10 may be all of sectioned regions DT of the different sectioned regions DT (eight in the embodiment) adjacent to the sectioned region DT where the dump truck 2 currently exists, namely, the above-described adjacent sectioned region DT, or may also be different sectioned regions DTA (three in this embodiment) illustrated in FIG. 12 and having no map information pieces DTI not yet stored in the map storage database 36 of the dump truck 2. The different sectioned region DT for which the management device 10 extracts the map information pieces DTI in step ST86 and transmits the same to the dump truck 2 in step ST87 may be all of sectioned regions DT of the different sectioned regions DT (eight in the embodiment) adjacent to the sectioned region DT where the dump truck 2 currently exists, namely, the above-described adjacent sectioned region DT. The different sectioned region DT for which the management device 10 extracts the map information pieces DTI in step ST86 and transmits the same to the dump truck 2 in step ST87 may be different sectioned regions DTA (three in this embodiment) illustrated in FIG. 12 and having map information pieces DTI not yet stored in the map storage database 36 of the dump truck 2.

The position measurement controller 33 of the navigation system 30 determines that a new map information piece DTI of a sectioned region DT is received from the management device 10 (step ST83: Yes) and stores the received map information piece DTI of the sectioned region DT in the map storage database 36 (step ST88), and the flowchart of step ST8 ends.

In the management system 1, when the determination unit 33A of the position measurement controller 33 determines that the position of the dump truck 2 is moved from one sectioned region DT to a different sectioned region DT (step ST81: Yes), the management device 10 newly extracts a map information piece DTI of a sectioned region DT and transmits the same to the dump truck 2, and with such processing, the map storage database 36 constantly stores a map information piece DTI of a sectioned region DT where the dump truck 2 currently exists and map information pieces DTI of a plurality of sectioned regions DT adjacent to and surrounding the sectioned region DT where the dump truck 2 currently exists. For example, in a case where the map storage database 36 stores map information pieces DTI of sectioned regions DT indicated by solid lines in FIG. 12 until the dump truck 2 is moved to a different sectioned region DT, when the dump truck 2 is moved to a different sectioned region DT as illustrated in a dot-and-dash line, the map storage database 36 stores map information pieces DTI of sectioned regions DT indicated by dot-and-dash lines in FIG. 12.

Furthermore, the determination unit 33A of the position measurement controller 33 determines that a solution of a GPS position detected by the GPS receiver 31 is not a fix solution, in other words, determines that an error of the GPS position of the dump truck 2 detected by the GPS receiver 31 exceeds the predetermined error (step ST7: No), the SMN position calculating unit 33B causes the dump truck 2 to travel along the travel route RP by detecting a position and an azimuth direction of the dump truck 2 on the basis of a detection result obtained by the laser sensor 24B and a map information piece DTI of a sectioned region DT stored in the map storage database 36 (step ST9). In other words, in the case of determining that the error of the GPS position detected by the GPS receiver 31 exceeds the predetermined error, the position measurement controller 33 detects a position and an azimuth direction of the dump truck 2 by matching the detection result obtained by the laser sensor 24B with the map information piece DTI of the sectioned region DT stored in the map storage database 36.

More specifically, in step ST9, the determination unit 33A of the position measurement controller 33 determines whether the position of the dump truck 2 is moved from one sectioned region DT to a sectioned region DT adjacent to the one sectioned region DT (Step ST91). In a case of determining that the position of the dump truck 2 is not moved from one sectioned region DT to a sectioned region DT adjacent to the one sectioned region DT (step ST91: No), the position measurement controller 33 detects a position and an azimuth direction of the dump truck 2 by matching a detection result obtained by the laser sensor 24B with a map information piece DTI of a sectioned region DT stored in the map storage database 36 (step ST92). Then, the dump truck 2 autonomously travels along the travel route RP on the basis of the position detected by the position measurement controller 33.

The position measurement controller 33 determines whether any new map information piece DTI of a sectioned region DT is received from the management device 10 (step ST93). In the case of detecting the position and the azimuth direction of the dump truck 2, the position measurement controller 33 determines that no new map information piece DTI of a sectioned region DT is received from the management device 10 (step ST93: No), and the processing returns to step ST91. Until a new map information piece DTI of a sectioned region DT is received from the management device 10, in other words, until the dump truck 2 is moved to a sectioned region DT adjacent to the one sectioned region DT, the position measurement controller 33 repeats the processing from step ST91 to step ST93 and detects a position and an azimuth direction of the dump truck 2 by matching a detection result obtained by the laser sensor 24B with a map information piece DTI of a sectioned region DT stored in the map storage database 36.

In a case where the determination unit 33A determines that the position of the dump truck 2 is moved from one sectioned region DT to a sectioned region DT adjacent to the one sectioned region DT (step ST91: Yes), the position measurement controller 33 transmits, to the management device 10, a request information to request a map information piece DTI of a different sectioned regions DT adjacent to the sectioned region DT where the dump truck 2 currently exists, namely, the above-mentioned adjacent sectioned region DT, together with information related to a position of the dump truck 2 (step ST94).

When the position of the dump truck 2 traveling along the travel route RP is moved from the one sectioned region DT to the adjacent sectioned region DT, the computer 11 of the management device 10 receives the request information transmitted from the dump truck 2 together with the information related to the position of the dump truck 2 (step ST95). Similar to step ST4, the computer 11 of the management device 10 extracts, on the basis of the received information related to the position of the dump truck 2, a map information piece DTI of a sectioned region DT where the dump truck 2 currently exists and map information pieces DTI of a plurality of different sectioned regions DT adjacent to and surrounding the sectioned region DT where the dump truck 2 currently exists, from among the map information pieces DTI of the plurality of sectioned regions DT stored in the storage device 13 (step ST96). Similar to step ST5, the management device 10 transmits the extracted map information pieces DTI of the plurality of sectioned regions DT (nine in this embodiment) to the dump truck 2 (step ST97).

In this case, in step ST94, the different sectioned region DT for which the position measurement controller 33 transmits the request information to the management device 10 may be all of sectioned regions DT of different sectioned regions DT (eight in the embodiment) adjacent to the sectioned region DT where the dump truck 2 currently exists, namely, the above-described adjacent sectioned region DT, or may also be different sectioned regions DTA (three in this embodiment) illustrated in FIG. 12 and having map information pieces DTI not yet stored in the map storage database 36 of the dump truck 2. The different sectioned region DT for which the management device 10 extracts the map information pieces DTI in step ST96 and transmits the same to the dump truck 2 in step ST97 may be all of sectioned regions DT of different sectioned regions DT (eight in the embodiment) adjacent to the sectioned region DT where the dump truck 2 currently exists, namely, the above-described adjacent sectioned region DT. The different sectioned region DT for which the management device 10 extracts the map information pieces DTI in step ST96 and transmits the same to the dump truck 2 in step ST97 may be different sectioned regions DTA (three in this embodiment) illustrated in FIG. 12 and having map information pieces DTI not yet stored in the map storage database 36 of the dump truck 2.

The position measurement controller 33 of the navigation system 30 determines that a new map information piece DTI of a sectioned region DT is received from the management device 10 (step ST93: Yes) and stores the received map information piece DTI of the sectioned region DT in the map storage database 36 (step ST98), and the flowchart of step ST9 ends.

Thus, the ROM of the position measurement controller 33 stores a program to cause the position measurement controller 33 to execute the processing in steps ST91, ST92, and ST94.

In the management system 1, when the determination unit 33A of the position measurement controller 33 determines that a position of the dump truck 2 is moved from one sectioned region DT to a sectioned region DT adjacent to the one sectioned region DT (step ST91: Yes), the management device 10 newly extracts a map information piece DTI of a sectioned region DT and transmits the same to the dump truck 2, and with such processing, the map storage database 36 constantly stores a map information piece DTI of a sectioned region DT where the dump truck 2 currently exists and map information pieces DTI of a plurality of sectioned regions DT adjacent to and surrounding the sectioned region DT where the dump truck 2 currently exists. For example, in a case where the map storage database 36 stores map information pieces DTI of sectioned regions DT indicated by solid lines in FIG. 12 until the dump truck 2 is moved to a different sectioned region DT, when dump truck 2 is moved to a different sectioned region DT as illustrated in a dot-and-dash line, the map storage database 36 stores map information pieces DTI of sectioned regions DT indicated by dot-and-dash lines in FIG. 12.

Thus, the ROM of the computer 11 of the management device 10 stores a program to cause the computer 11 to execute the processing in step ST95, step ST96, and step ST97.

In the management system 1 according to the embodiment, each of a plurality of dump trucks 2 creates map information pieces DTI of sectioned regions DT around an own vehicle, and the management device 10 manages the map information pieces DTI of the plurality of sectioned regions DT. The management system 1 transmits, to each dump truck 2, a map information piece DTI of a sectioned region DT where each dump truck 2 exists and map information pieces DTI of sectioned regions DT adjacent to the sectioned region DT where each dump truck 2 exists on the basis of information related to a position of each dump truck 2. Therefore, the management system 1 can reduce an information amount to be transmitted from the management device 10 to each dump truck 2 more than in a case of transmitting entire map information MI, and can suppress a required time related to reception in the dump truck 2. As a result, even in a situation where a dump truck 2 cannot detect a position and an azimuth direction by a GPS, the management system 1 can cause the dump truck 2 to travel along the travel route RP on the basis of map information pieces DTI of sectioned regions DT, and can continue travel of the dump truck 2, namely, operation in a mine M.

Furthermore, in the embodiment, in a case where the management device 10 preferentially transmits a map information piece DTI of a sectioned region DT created by each dump truck 2, the management system 1 can reduce a difference between an acquired map information piece DTI and a received map information piece DTI by the dump truck 2. As a result, the management system 1 can cause the dump truck 2 to travel along the travel route RP and can continue travel of the dump truck 2, namely, operation in the mine M on the basis of map information pieces DTI of sectioned regions DT received from the management device 10.

Furthermore, in the embodiment, in a case where the management device 10 preferentially transmits a map information piece DTI of a sectioned region DT having a short elapsed time after being created, the management system 1 can reduce a difference between an acquired map information piece DTI and a received map information piece DTI by the dump truck 2. As a result, the management system 1 can cause the dump truck 2 to travel along the travel route RP and can continue travel of the dump truck 2, namely, operation in the mine M on the basis of map information pieces DTI of sectioned regions DT received from the management device 10.

In the embodiment, when a dump truck 2 is moved to an adjacent sectioned region DT, the management system 1 transmits a request signal to the management device 10, and the management device 10 transmits, to the dump truck 2, map information pieces DTI of different sectioned regions DT adjacent to the adjacent sectioned region DT. Therefore, the management system 1 can reduce an information amount to be exchanged between the dump truck 2 and the management device 10 more than in a case of exchanging the entire map information MI. As a result, the management system 1 can promptly transmit map information pieces DTI of sectioned regions DT from the management device 10 to the dump truck 2, and even when the dump truck 2 cannot detect a position and an azimuth direction by a GPS, the dump truck 2 can travel along the travel route RP on the basis of the sectioned regions DT and a detection result obtained by the laser sensor 24B, and can continue travel of the dump truck 2, namely, operation in the mine M can be continued.

Additionally, when a dump truck 2 is moved to an adjacent sectioned region DT, the management system 1 transmits, to the management device 10, information related to a current position of the dump truck 2 together with a request signal. Therefore, the management device 10 of the management system 1 can transmit, to the dump truck 2, a map information piece DTI of a different sectioned region DT adjacent to a sectioned region DT where the dump truck 2 currently exists. As a result, even in a situation where the dump truck 2 cannot detect a position and an azimuth direction by a GPS, the management system 1 can cause the dump truck 2 to travel along the travel route RP on the basis of the sectioned region DT and a detection result obtained by the laser sensor 24B, and can continue travel of the dump truck 2, namely, the operation in the mine M.

Furthermore, in the management system 1, a storage capacity of the map storage database 36 provided in the dump truck 2 can be suppressed because the map storage database 36 of the dump truck 2 stores the map information pieces DTI of the plurality of sectioned regions DT and there is no need to store the entire map information MI.

When a solution of a GPS position detected by the GPS receiver 31 is not a fix solution, the dump truck 2 according to the embodiment detects a position and an azimuth direction of a dump truck 2 by matching a detection result obtained by the laser sensor 24B with a map information piece DTI of a sectioned region DT stored in the map storage database 36. As a result, even when the dump truck 2 cannot detect a position and an azimuth direction by a GPS, the dump truck 2 can detect a position and an azimuth direction on the basis of a detection result obtained by the laser sensor 24B having a resolution higher than that of the radar 24A, and travel of the dump truck 2, namely, the operation in the mine M can be continued.

Additionally, when a solution of a GPS position detected by the GPS receiver 31 is a fix solution, the dump truck 2 causes the dump truck 2 to autonomously travel along the travel route RP on the basis of the GPS position and the like. Therefore, when a solution of a GPS position detected by the GPS receiver 31 is a fix solution, the dump truck 2 can cause the dump truck 2 to autonomously travel along the travel route RP with high accuracy, and can continue the operation in the mine M.

Furthermore, when a solution of a GPS position detected by the GPS receiver 31 is a fix solution, the dump truck 2 creates a map information piece DTI of a sectioned region DT formed at a position of an upward projecting object VP, and stores the same in the map storage database 36 on the basis of a detection result obtained by the laser sensor 24B while the dump truck 2 is made to autonomously travel along the travel route RP on the basis of the GPS position and the like. As a result, even in a situation where a position and an azimuth direction cannot be detected by a GPS, the dump truck 2 can travel along the travel route RP on the basis of the map information piece DTI of the sectioned region DT and the detection result obtained by the laser sensor 24B, and can continue travel of the dump truck 2, namely, operation in the mine M.

In a case where a different sectioned region DT for which the position measurement controller 33 transmits request information to the management device 10 and a different sectioned region DT for which the management device 10 transmits to the dump truck 2 are sectioned regions DT having map information pieces DTI not yet stored in the map storage database 36 of the dump truck 2, even when the dump truck 2 is moved to an adjacent sectioned region DT, the dump truck 2 can travel along the travel route RP on the basis of map information pieces DTI of sectioned regions DT stored in the map storage database 36. As a result, even in a situation where a position and an azimuth direction cannot be detected by a GPS, the management device 10 can cause the dump truck 2 to travel along the travel route RP on the basis of the map information pieces DTI of the sectioned regions DT and a detection result obtained by the laser sensor 24B, and can continue travel of the dump truck 2, namely, operation in the mine M.

In a case where a different sectioned region DT for which the position measurement controller 33 transmits request information to the management device 10 and a different sectioned region DT for which the management device 10 transmits to the dump truck 2 are sectioned regions DT having map information pieces DTI not yet stored in the map storage database 36 of the dump truck 2, the management system 1 can further reduce an information amount to be exchanged between the dump truck 2 and the management device 10.

In the embodiment, the navigation system 30 creates sectioned regions DT of map information MI and detects a position and an azimuth direction of a dump truck 2 by using a detection result obtained by the laser sensor 24B. In the present invention, the navigation system 30 may also create sectioned regions DT of the map information MI and detect a position and an azimuth direction of a dump truck 2 by using a detection result obtained by the radar 24A provided as a distance measuring sensor. Additionally, in the present invention, the navigation system 30 may also create sectioned regions DT of the map information MI and detect a position and an azimuth direction of a dump truck 2 by using detection results obtained by a plurality of charge-coupled device (CCD) cameras provided in a dump truck 2 as distance measuring sensors.

The above-described constituent elements of the embodiment include those readily conceivable by a man skilled in the art, those substantially identical, and those included in a so-called equivalent range. Furthermore, the above-described constituent elements of the embodiment can be suitably combined. Additionally, some of above-described components of the embodiment may not be used.

Meanwhile, the description of the above-described embodiment has been provided by exemplifying a mining machine used in a mine M, but not limited thereto, the present invention may also be applied to a work machine used in an underground mine and a work machine used in a work site on the ground. The work machine is to include a mining machine.

In the embodiment, it has been described that a different work machine 3 can create a map information piece DTI of a sectioned region DT, but it is not necessary for all of different work machines 3 to be able to create a map information piece DTI of a sectioned region DT.

Furthermore, in the present invention, only a dump truck 2 may be able to create a map information piece DTI of a sectioned region DT. Additionally, in the embodiment, it has been described that when the dump truck 2 is moved to an adjacent sectioned region DT, a position of an upward projecting object VP is transmitted to the management device 10 as a map information piece DTI of a sectioned region DT, but a position of an upward projecting object VP may also be transmitted at predetermined time interval such as daily or weekly. Furthermore, every time a dump truck 2 passes, a logical sum of detection values may be saved in an upward projecting object VP, and when the dump truck 2 passes predetermined times, for example, five times or the like, a position of the upward projecting object VP may be transmitted to the management device 10. While the example of utilizing correction observation information using the GPS base station 19 to detect a GPS position has been described in the embodiment, a position may be detected only by the GPS receiver 31 of the dump truck 2.

Additionally, in the present invention, whether an error (accuracy) of a GPS position is the predetermined error or less may also be determined only by the GPS receiver 31 of the dump truck 2 without using the correction observation information of the GPS base station 19.

Additionally, in the above-described embodiment, a position of a mining machine is detected by using the GPS receiver 31, but not limited thereto, a position of a mining machine may also be detected on the basis of a known "position detecting unit". Particularly, since a GPS cannot be detected in an underground mine, it may be possible to use self-position estimation for a work machine or the like using known position detecting devices such as an indoor messaging system (IMES), a pseudo satellite (pseudolite), a radio frequency identifier (RFID), a beacon, a surveying instrument, a radio LAN, an ultra wide band (UWB), a simultaneous localization and mapping (SLAM), and a landmark (mark provided beside a travel route). These position detecting devices may also be used for a mining machine in a mine M on the ground or a work machine used in a work site on the ground.

Furthermore, as an exemplary "control system for a work machine", a control system for a dump truck in a mine M on the ground has been described in the above-described embodiment, but not limited thereto, the present invention also includes a control system for a different mining machine in a mine M on the ground, a work machine in an underground mine, or a work machine used in a work site on the ground (such as an excavator, a bulldozer, and a wheel loader) and including a "position detecting device", and also a work machine including a "non-contact sensor" and a "position calculating unit".

REFERENCE SIGNS LIST

1 Management system
2 Dump truck (work machine)
7 Control facility
10 Management device (management device for work machine)
20 Travel controller (travel control unit)
21 Vehicle body
24A Radar (distance measuring sensor)
24B Laser sensor (distance measuring sensor)
2 Speed sensor
30 Navigation system
31 GPS receiver (position detecting unit)
32A Route position storage unit (route position storing unit)
33 Position measurement controller (measurement output unit)
33A Determination unit (determining unit)
36 Map storage database
RP Travel route
VP Upward projecting object
BK Bank
DT Sectioned region (region)
DTI Map information piece

The invention claimed is:

1. A management system for a work machine, comprising:
   a plurality of work machines each for creating a map information piece of a region around an own vehicle; and
   a management device for managing map information pieces of a plurality of the regions created by the plurality of work machines respectively, and for transmitting, to each of the work machines, a map information piece of a region where each of the work machines exists and a map information piece of a region adjacent to the region where each of the work machines exists on the basis of information related to a position of each of the work machines.

2. The management system for a work machine according to claim 1, wherein the management device preferentially transmits a map information piece of a region created by each of the work machines from among the map information pieces of the plurality of regions.

3. The management system for a work machine according to claim 1, wherein the management device preferentially transmits a map information piece of a region having a short elapsed time after being created from among the map information pieces of the plurality of regions.

4. The management system for a work machine according to claim 1, wherein
   the work machine includes: a map information storing unit for storing a map information piece of the region received from the management device; a measurement output unit for detecting a position by matching the map information piece of the region stored in the map information storing unit with a detection result obtained by a distance measuring sensor that detects a position of a surrounding object; and a determining unit for determining whether movement is made to an adjacent region, when the determining unit determines that the work machine is moved to the adjacent region, the measurement output unit transmits, to the management device, request information to request a map information piece of a different region adjacent to the adjacent region together with information related to a position of the work machine, and when the request information is received, the management device extracts the different region on the basis of the information related to the position of the work machine, and transmits a map information piece of the extracted different region to the work machine.

5. The management system for a work machine according to claim 2, wherein the different region for which the measurement output unit transmits the request information to the management device is a region having a map information piece not yet stored in the map information storing unit.

6. A work machine comprising:
a map information storing unit for storing a map information piece of a region where an own vehicle exists and a map information piece of a region adjacent to the region where the own vehicle exists from among map information pieces of a plurality of regions created by a plurality of work machines;
a distance measuring sensor for detecting a position of a surrounding object;
a position detecting unit for detecting a GPS position;
a determining unit for determining whether movement is made to an adjacent region and also for determining whether an error of a GPS position detected by the position detecting unit is a predetermined error or less; and
a measurement output unit for detecting a position of an upward projecting object projecting upward from a surface of a travel route on the basis of a detection result obtained by the position detecting unit and a detection result obtained by the distance measuring sensor when the determining unit determines that an error of a GPS position detected by the position detecting unit is the predetermined error or less, and for transmitting via a communication device, to a management device, a position of the detected upward projecting object, as the map information piece of the region, when the determining unit determines that movement is made to the adjacent region.

7. The work machine according to claim 6, wherein when the determining unit determines that an error of a GPS position detected by the position detecting unit exceeds the predetermined error, the measurement output unit detects a position of the work machine by matching a detection result obtained by the distance measuring sensor with a map information piece of a region stored in the map information storing unit, and when the determining unit determines that movement is made to the adjacent region, the measurement output unit transmits, to the management device, request information to request a map information piece of a different region adjacent to the adjacent region together with information related to a position.

8. The work machine according to claim 7, wherein the different region for which the measurement output unit transmits the request information to the management device is a region having a map information piece not yet stored in the map information storing unit.

9. A management device for a work machine, comprising:
a processing device; and
a communication device,
wherein the processing device manages map information pieces of a plurality of regions created by a plurality of work machines, and also transmits via the communication device, to each of the work machines, a map information piece of a region where each of the plurality of work machines exists and a map information piece of a region adjacent to the region where each of the work machines exists from among the plurality of regions; and
the processing device extracts a different region on the basis of information related to a position of the work machine, and transmits via the communication device a map information piece of the extracted different region to the work machine when the work machine is moved to an adjacent region and request information to request the map information piece of the different region adjacent to the adjacent region is received together with the information related to the position of the work machine.

10. The management device for a work machine according to claim 9, wherein the different region for which a map information piece is transmitted to the work machine is a region having a map information piece not yet stored in the work machine.

* * * * *